(12) United States Patent
Oike

(10) Patent No.: US 9,490,992 B2
(45) Date of Patent: Nov. 8, 2016

(54) REMOTE CONFERENCE SAVING SYSTEM FOR MANAGING MISSING MEDIA DATA AND STORAGE MEDIUM

(71) Applicant: Kenji Oike, Nagoya (JP)

(72) Inventor: Kenji Oike, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 220 days.

(21) Appl. No.: 14/068,668

(22) Filed: Oct. 31, 2013

(65) Prior Publication Data

US 2014/0119243 A1 May 1, 2014

(30) Foreign Application Priority Data

Oct. 31, 2012 (JP) ................................. 2012-240546

(51) Int. Cl.
| | | |
|---|---|---|
| *H04L 12/18* | (2006.01) | |
| *H04M 3/56* | (2006.01) | |
| *H04N 7/15* | (2006.01) | |
| H04N 21/647 | (2011.01) | |

(52) U.S. Cl.
CPC ....... *H04L 12/1827* (2013.01); *H04L 12/1831* (2013.01); *H04M 3/567* (2013.01); *H04N 7/155* (2013.01); *H04L 12/1818* (2013.01); *H04L 12/1822* (2013.01); *H04N 21/64792* (2013.01)

(58) Field of Classification Search
CPC .... H04N 7/15; H04N 7/155; H04N 21/8547; H04L 12/1831; H04L 12/1818; H04L 12/1822; H04L 47/32; H04M 3/567
See application file for complete search history.

(56) References Cited

U.S. PATENT DOCUMENTS

| | | | |
|---|---|---|---|
| 7,548,951 B2 | 6/2009 | Nagayama et al. | |
| 2005/0228861 A1* | 10/2005 | Nagayama | ........ G06F 17/30044 709/204 |
| 2008/0100694 A1* | 5/2008 | Barkley | ................ H04N 7/152 348/14.08 |
| 2012/0030682 A1* | 2/2012 | Shaffer | ............... H04L 65/1076 718/103 |
| 2012/0051254 A1* | 3/2012 | Paine | .................. H04L 41/5035 370/252 |
| 2012/0096091 A1* | 4/2012 | Miyama | ................ G06F 19/321 709/205 |
| 2012/0128322 A1* | 5/2012 | Shaffer | ................ H04N 9/8205 386/241 |

FOREIGN PATENT DOCUMENTS

| | | |
|---|---|---|
| JP | 2002-077240 A | 3/2002 |
| JP | 2006-333417 A | 12/2006 |
| JP | 4551668 B2 | 9/2010 |

* cited by examiner

*Primary Examiner* — Andrew Chriss
*Assistant Examiner* — Salvador E Rivas
(74) *Attorney, Agent, or Firm* — Banner & Witcoff, Ltd.

(57) ABSTRACT

A remote conference system includes: a communication terminal; and a conference server connected to the communication terminal via an IP network, wherein the communication terminal performs processes comprising: detecting a state of the IP network between the conference server and the communication terminal; performing first determination on whether to transmit partial media data to the conference server, based on the detected state of the IP network; performing first transmission of transmitting the partial media data to the conference server if it is determined to transmit the partial media data; performing first saving of saving the partial media data in a storage device of the communication terminal when it is determined to not transmit the partial media data; and performing second transmission of transmitting partial media data saved in the storage device, as missing partial media data, to the conference server at a predetermined timing.

15 Claims, 14 Drawing Sheets

FIG. 14

| TYPE OF MEDIA | RECEPTION TIME | MISSING | FRAME NUMBER |
|---|---|---|---|
| SOUND | 20120903 090030 225 | NO | 1 |
| ⋮ | ⋮ | ⋮ | ⋮ |
| SOUND | 20120903 090030 230 | NO | 100 |
| IMAGE | 20120903 090030 241 | NO | 60 |
| SOUND | 20120903 090030 264 | NO | 101 |
| SOUND | — | YES | 102 |
| IMAGE | — | YES | 62 |
| ⋮ | ⋮ | ⋮ | ⋮ |

REMOTE CONFERENCE SAVING SYSTEM FOR MANAGING MISSING MEDIA DATA AND STORAGE MEDIUM

CROSS-REFERENCE TO RELATED APPLICATION

This application claims priority to Japanese Patent Application No. 2012-240546 filed on Oct. 31, 2012, the content of which is hereby incorporated herein by reference.

TECHNICAL FIELD

This disclosure relates to a remote conference saving system capable of transmitting or receiving media data via a network to thus perform a remote conference, and capable of saving media data.

BACKGROUND

There is a remote conference system in which images and sounds acquired by communication terminals, which images and sounds can be input to or output from, are transmitted or received among the communication terminals via a network and a conference server, whereby a remote conference is performed. For example, there is a remote conference system capable of saving transmitted or received media data at the time of a remote conference. Images and sounds included in the saved media data can be replay later, whereby the contents of the remote conference can be reproduced.

As a known technology capable of saving media data related to a remote conference, there is a remote conference system configured by connecting a plurality of conference terminals to a conference server having a conference data storage unit, via a network. For example, if conference data including images and sounds indicating the situation of a conference is received from the conference terminals, the conference server saves the conference data in the conference data storage unit in real time. Therefore, according to the known technology, it is possible to reproduce and grasp the contents of a remote conference by replay conference data saved in the data storage unit.

Also, in a known remote conference system as described above, media data including images and sounds indicating the situation of a remote conference are transmitted or received in real time among conference terminals participating in the conference, whereby the remote conference proceeds. For this reason, if a delay occurs in transmission or reception of the media data due to congestion in a network among the conference terminals, the delay interferes with the progress of the remote conference. With respect to this congestion in a network, there is a technology in which a transmission side terminal intentionally discards packets configuring a portion of media data in a case where congestion occurs in a network. According to this technology, even in a case where congestion occurs in a network, a real-time property is maintained with respect to transmission and reception of media data.

SUMMARY

However, in a case where some packets are discarded by the transmission side terminal according to congestion in a network at the time of performance of a conference, the real-time property of media data at the time of the performance of the conference is maintained; however, a portion of the media data is missed. The missing of a portion of the media data causes deterioration in the qualities of images and sounds included in the media data. Further, the media data whose portion has been missed is saved in a data storage unit. Furthermore, since some packs are discarded, it is also impossible to fill the missing of the saved media data later. Therefore, even if the media data saved in the data storage unit is replayed later, due to the missing of a portion, it is impossible to sufficiently reproduce the contents of the performed remote conference. For example, even if a user who couldn't participate in the remote conference replays the media data saved in the data storage unit, the missing of the information in the contents due to discarding of some packets is reproduced, and thus the user may be inhibited from grasping the contents of the remote conference.

This disclosure provides at least a remote conference saving system and the like capable of transmitting or receiving media data via a network, thereby performing a remote conference, and capable of saving media data with high reproducibility of the remote conference while performing transmission and reception of the media data in a mode according to a state of the network.

A remote conference system according to one aspect of this disclosure comprises: a communication terminal; and a conference server connected to the communication terminal via an IP network, wherein the communication terminal comprises: a first processor; and first memory storing computer-readable instructions that, when executed by the first processor, instruct the first processor to perform processes comprising: generating partial media data composing a portion of media data at predetermined intervals, wherein the media data includes at least one of image data and sound data and the media data is to be transmitted to the conference server via the IP network in a remote conference; adding identification information indicating an order of a temporal position of the partial media data in the media data, to the partial media data; detecting a state of the IP network between the conference server and the communication terminal; performing first determination on whether to transmit the partial media data to the conference server, based on the detected state of the IP network; performing first transmission of transmitting the partial media data to the conference server when it is determined to transmit the partial media data to the conference server by the first determination; performing first saving of saving the partial media data in a storage device of the communication terminal when it is determined to not transmit the partial media data to the conference server by the first determination; and performing second transmission of transmitting partial media data saved in the storage device, as missing partial media data, to the conference server at a predetermined timing, and wherein the conference server comprises: a second processor; and second memory storing computer-readable instructions that, when executed by the second processor, instruct the second processor to perform processes comprising: performing first reception of receiving the partial media data from the communication terminal; performing second saving of saving the partial media data received in the first reception, in a storage device of the conference server; performing second reception of receiving the missing partial media data from the communication terminal; performing third saving of saving the missing partial media data received in the second reception, in association with missing information indicating that the partial media data received in the second reception is the missing partial media data, in the storage device of the conference server; and generating the media data based on the partial media data and the missing partial media data stored in the storage device of the conference server.

A non-transitory computer-readable medium according to another aspect of this disclosure stores computer-readable instructions that, when executed by a processor of a communication terminal, instruct the processor to perform processes comprising: generating partial media data composing a portion of media data at predetermined intervals, wherein the media data includes at least one of image data and sound data and the media data is to be transmitted to the conference server, connected to the communication terminal via a network in a remote conference; adding identification information indicating an order of a temporal position of the partial media data in the media data, to the partial media data; detecting a state of the network between the conference server and the communication terminal; performing first determination on whether to transmit the partial media data to the conference server, based on the detected state of the network; performing first transmission of transmitting the partial media data to the conference server when it is determined to transmit the partial media data to the conference server by the first determination; performing first saving of saving the partial media data in a storage device of the communication terminal when it is determined to not transmit the partial media data to the conference server by the first determination; and performing second transmission of transmitting partial media data saved in the storage device, as missing partial media data, to the conference server at a predetermined timing.

A non-transitory computer-readable medium storing according to another aspect of this disclosure stores computer-readable instructions that, when executed by a processor of a conference server, instruct the processor to perform processes comprising: performing first reception of receiving partial media data including image data and sound data from a communication terminal, the partial media data composing a portion of media data which is received from the communication terminal in a remote conference, wherein the partial media data includes identification information indicating an order of a temporal position of the partial media data in the media data; performing first saving of saving the partial media data received in the first reception, in a storage device of the conference server; performing second reception of receiving missing partial media data including image data and sound data from the communication terminal, the missing partial media data composing another portion of the media data, which is received from the communication terminal in the remote conference and is different from the portion of the media data which the partial media data configures, wherein the missing partial media data includes the identification information; performing second saving of saving the missing partial media data received in the second reception, in association with missing information indicating that the partial media data received in the second reception is the missing partial media data, in the storage device; and generating the media data based on the partial media data and the missing partial media data stored in the storage device.

BRIEF DESCRIPTION OF THE DRAWINGS

The foregoing and additional features and characteristics of this disclosure will become more apparent from the following detailed descriptions considered with the reference to the accompanying drawings, wherein:

FIG. 14 is an explanatory view illustrating an example of a timing table in the remote conference saving system according to the illustrative embodiment.

DETAILED DESCRIPTION

Hereinafter, an illustrative embodiment of this disclosure will be described.

(Configuration Remote Conference Saving System)

Figure 1:
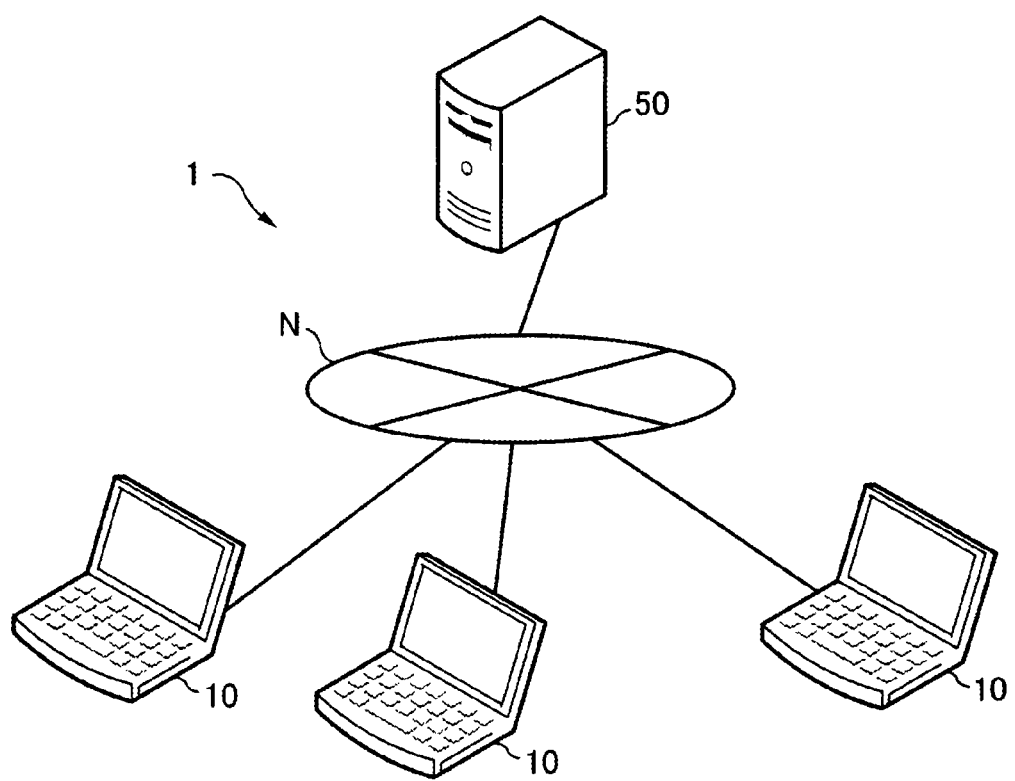
FIG. 1 is an explanatory view illustrating an example of the configuration of a remote conference saving system.

First, the configuration of a remote conference saving system 1 according to the present illustrative embodiment will be described in detail with reference to FIG. 1. As shown in FIG. 1, in the remote conference saving system 1 according to the present illustrative embodiment, a plurality of conference terminals 10 corresponding to communication terminals according to this disclosure and a conference server 50 are connected to each other via a network N. The corresponding remote conference saving system 1 is configured to be able to perform a remote conference (television conference) using images and sounds, and to be able to save media data which is a record of the situation of the corresponding remote conference, as conference record data.

Further, in the remote conference saving system 1, each conference terminal 10 is connected to the conference server 50 via the network N and is used by a user who wants to participate in a remote conference. Each conference terminal 10 corresponds to a communication terminal of this disclosure and is configured by connecting some devices such as a camera 33 and a microphone 34 (to be described below) to a general-purpose personal computer, and installing an application program and the like related to a remote conference (to be described below). At the time of a remote conference, the individual conference terminals 10 participating in the remote conference perform communication of a variety of data such as image data acquired by cameras 33, sound data acquired by microphones 34, and material data such as documents and videos to be used in the remote conference, with one another of the individual conference terminals 10, via the network N and the conference server 50.

Also, in the following description, media data may include image data acquired by the camera 33 of each conference terminal 10, and sound data on sounds such as conference sounds collected by the microphone 34 of each conference terminal 10. Further, in the present illustrative embodiment, as a remote conference, a web conference is exemplified. Therefore, sound data and image data are transmitted and received as separate data without being multiplexed between each conference terminal 10 and the conference server 50. Also, image data which can be included in media data is not limited to image data acquired by the camera 33, but image data related to shared data needing a real-time property, such as video files, sharing of an application, and an annotation function can also be included.

The conference server 50 controls a remote conference which is performed among the plurality of conference terminals 10, via the network N. Further, the conference server 50 relays media data received from each conference terminal 10 to the other conference terminals 10 participating in the remote conference, via the network N and another conference server 50. As a result, media data generated by the plurality of conference terminals 10 is shared in the remote conference saving system 1. In the remote conference saving system 1, even in a case where all participants of a conference are not at the same place, the participants can smoothly carry out the conference. Also, each conference server 50 includes a saving service unit 65, and can control the corresponding saving service unit 65, thereby saving media data transmitted and received in the remote conference in real time.

Also, in the present illustrative embodiment, the remote conference saving system 1 is described so as to be configured to be one conference server 50, but is may be configured to have a plurality of conference servers 50. In this case, the conference servers 50 are connected to one another such that communication is possible, and a variety of data such as media data can be transmitted and received between the plurality of the conference servers 50.

(Configuration of Conference Terminal)

Subsequently, a control system of a conference terminal 10 will be described with reference to FIG. 2. Also, the remote conference saving system 1 according to the present illustrative embodiment has a plurality of conference terminals 10, and the individual conference terminals 10 are basically the same in the configurations of their control systems except that the conference terminals 10 are placed at different locations. Therefore, in the following description, a control system configuration of one conference terminal 10 will be described, and the control system configurations of the other conference terminals 10 will not be described.

Figure 2:
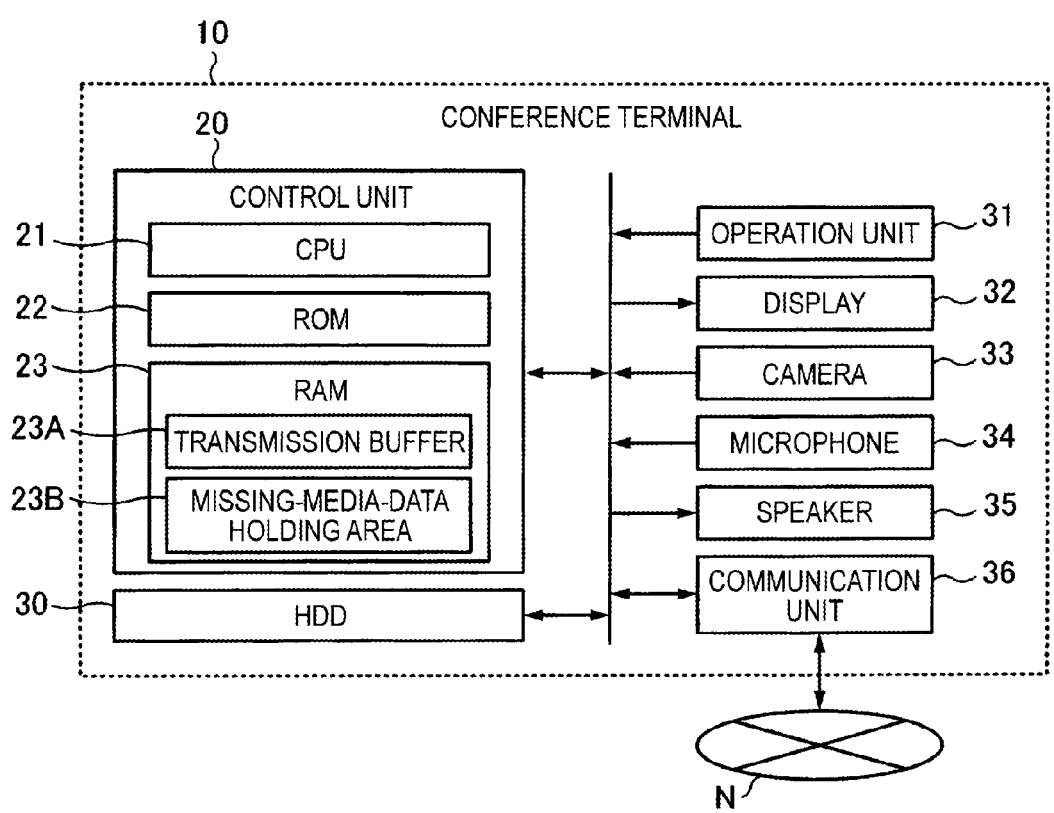
FIG. 2 is a block diagram illustrating a control system of a conference terminal.

As shown in FIG. 2, a conference terminal 10 includes a control unit 20 taking charge of control on the conference terminal 10. The control unit 20 is configured to include a CPU 21, a ROM 22, and a RAM 23. The CPU 21 is a central processing unit for executing a variety of control programs in the conference terminal 10. The ROM 22 stores a boot program, a basic input/output system (BIOS), and an operating system (OS).

Further, the RAM 23 temporarily stores a timer, a counter, computation results obtained by executing control programs, etc. Also, the value of the timer may be acquired, for example, from the clocking function of the OS. Also, the RAM 23 includes a transmission buffer 23A and a missing-media-data holding area 23B. The transmission buffer 23A is a storage area for temporarily storing media data generated in real time at predetermined time intervals according to an image data generating program (see FIG. 5) when the media data is transmitted via the network N. Also, each media data item stored in the transmission buffer 23A configures a portion of media data received or to be transmitted from when start to end of a remote conference and is an example of partial media data of this disclosure.

The missing-media-data holding area 23B is a storage area for temporarily holding a portion of media data (that is, missing media data) if the corresponding portion cannot be transmitted in real time due to occurrence of congestion in the network N. Also, each media data item stored in the missing-media-data holding area 23B configures a portion of media data received or to be transmitted or from start to end of a remote conference, and corresponds to a media data item which couldn't be transmitted in real time and thus is an example of missing partial media data of this disclosure.

The control unit 20 is electrically connected to a hard disk drive (HDD) 30, an operation unit 31, a display 32, a camera 33, a microphone 34, a speaker 35, and a communicating unit 36. The HDD 30 stores a variety of programs such as a variety of control programs to be executed by the CPU 21, and an application program related to remote conferences. Specifically, the HDD 30 stores a main control program (see FIG. 4), the media data generating program (see FIG. 5), a transmission necessity determining program (see FIG. 6), a missing-media-data transmission possibility determining program (see FIG. 7), and a conference record data replay program (see FIG. 13). Further, the HDD 30 stores a variety of data such as a data table usable to carry out a remote conference. Also, the HDD 30 may store the OS as a substitute for the ROM 22.

The operation unit 31 is an input device such as a keyboard or a mouse for receiving an operation from a conference participant. The CPU 21 acquires operation information according to the operation of the conference participant, from the operation unit 31. The display 32 displays desired images, and displays images transmitted as media data from other conference terminals 10, and the image contents of media data stored in the conference server 50 when the media data is replayed as conference record data according to the conference record data replay program (see FIG. 13). At the time of the remote conference, the camera 33 acquires image data by acquiring images of the place of the conference terminal (10) side. At the time of the remote conference, the microphone 34 acquires sound data by recording sounds of the place of the conference terminal (10) side. The speaker 35 outputs sound data transmitted as the above described media data from other conference terminals 10.

The communicating unit 36 performs control on communication with other conference terminals 10 participating in a remote conference via the network N. Specifically, when image data acquired by a camera 33 is transmitted or received as media data, the communicating unit 36 performs a process of performing packetization of (that is, generation of media packets) or depacketization on corresponding images.

(Configuration of Conference Server)

Figure 3:
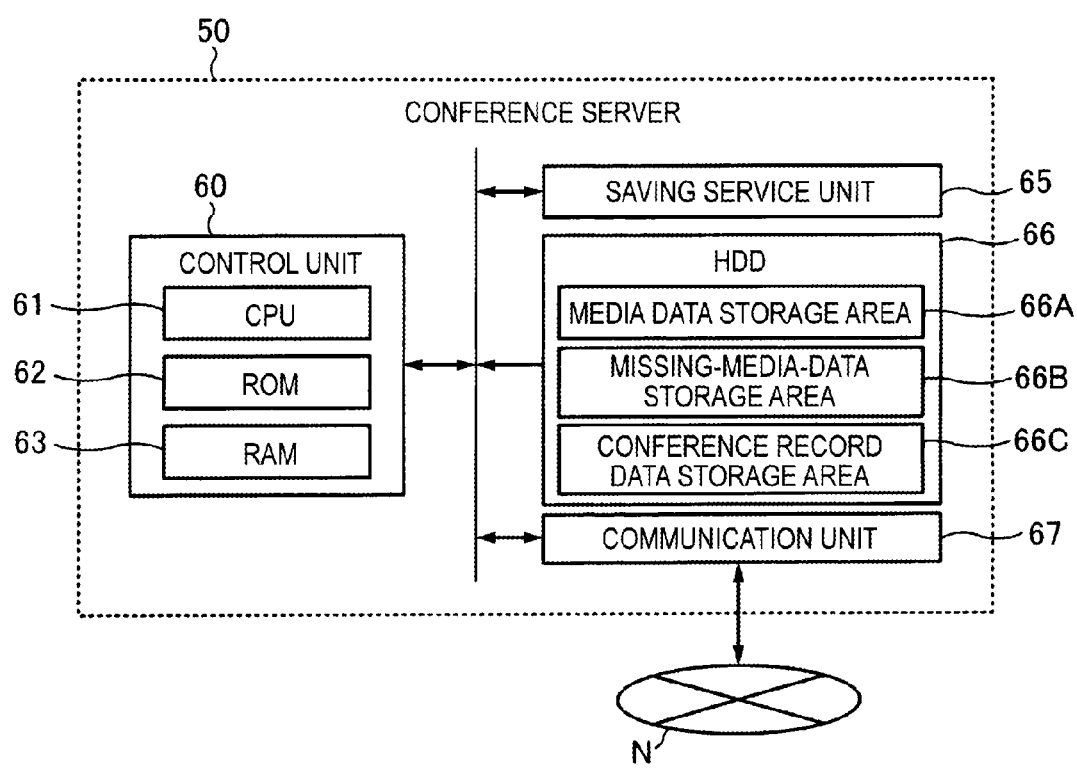
FIG. 3 is a block diagram illustrating a control system of a conference server.

The control system of the conference server 50 will be described with reference to FIG. 3. As shown in FIG. 3, the conference server 50 includes a control unit 60 taking charge of control on the conference server 50. The control unit 60 is configured to include a CPU 61, a ROM 62, and a RAM 63. The CPU 61 is a central processing unit for executing a variety of control programs in the conference server 50. The ROM 62 stores a boot program, a BIOS, and an OS. The RAM 63 temporarily stores a timer, a counter, computation results obtained by executing control programs, etc.

The control unit 60 is electrically connected to a saving service unit 65, an

HDD 66, and a communicating unit 67. The saving service unit 65 is used to save media data received and to be transmitted in remote conferences in real time. According to control of the CPU 61, the saving service unit 65 performs saving of media packets in the HDD 66, and generation of media data based on the saved media packets (that is, generation of conference record data). Also, the HDD 66 may store the OS as a substitute for the ROM 62.

The HDD 66 is a mass storage device capable of storing a variety of data, and stores a variety of control programs necessary to control the conference server 50, and data tables. Specifically, the HDD 66 stores a main control program (see FIG. 8), a conference record data generating program (see FIG. 9), a necessary-media-data reception determining program (see FIG. 10), and a missing-media-data receiving program (see FIG. 11).

The HDD 66 includes a media data storage area 66A, a missing-media-data storage area 66B, and a conference record data storage area 66C. The media data storage area 66A is a storage area for storing media data based on media packets transmitted in real time from each conference terminal 10 configuring the remote conference saving system 1, according to control of the CPU 61 on the saving service unit 65, in a case of receiving the media packets in real time. Also, in the present illustrative embodiment, a media packet means a packet that is obtained by packetizing media data of one frame stored in a transmission buffer 23A and is transmitted in real time from a conference terminal 10.

The missing-media-data storage area 66B is a storage area for storing media data of one frame based on each media packet transmitted as a missing media packet from a conference terminal 10 configuring the remote conference saving system 1 via the network N, according to control of the CPU 61 on the saving service unit 65, in a case where the network N is in a predetermined state and the corresponding media packet is received as a missing media packet. Also, a missing media packet means a packet that is obtained by packetizing missing media data stored in the missing-media-data holding area 23B of a conference terminal 10.

The conference record data storage area 66C is a storage area for storing a series of media data from start to end of a remote conference, generated based on media packets and missing media packets transmitted and received at the time of the remote conference, as conference record data based on control of the saving service unit 65. It is possible to use each conference terminal 10 to execute the conference record data replay program (see FIG. 13), thereby replaying the conference record data stored in the conference record data storage area 66C. Therefore, a user can use a conference terminal 10 to replay media data, thereby reproducing the contents of a remote conference after end of the remote conference. This point will be described in detail later. Further, the communicating unit 67 performs control related to data communication, such as control related to depacketization of media packets and missing media packets received from each conference terminal 10, and control for relaying a variety of data transmitted and received from each conference terminal 10 at the time of a remote conference.

(Main Control Program of Conference Terminal)

Subsequently, the main control program of a conference terminal 10 configuring the remote conference saving system 1 will be described in detail with reference to FIG. 4.

The main control program is executed by the CPU 21 of the conference terminal 10 and is used for control related to data transmission from start to end of a remote conference.

Figure 4:
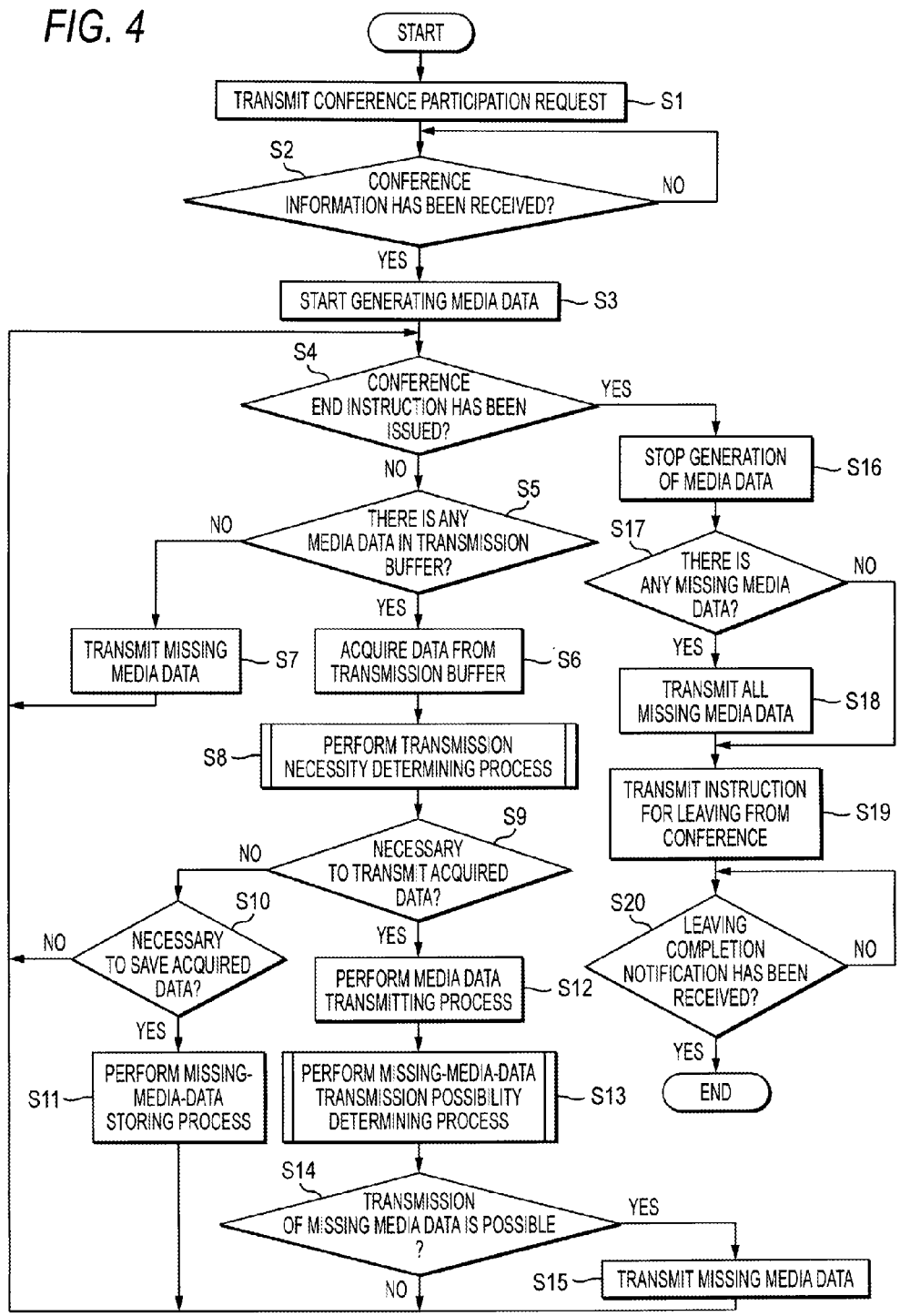
FIG. 4 is a flow chart illustrating a main control program in the conference terminal.

As shown in FIG. 4, first, in step S1, based on an operation on the operation unit 31, the CPU 21 transmits a conference participation request for requesting participation in a remote conference, to the conference server 50 via the network N. The conference participation request includes a conference ID for specifying a desired remote conference, a conference password for confirming the right to participate in the corresponding remote conference, and a user ID for identifying the conference terminal 10. After the conference participation request is transmitted to the conference server 50, the process of the CPU 21 proceeds to step S2.

In step S2, the CPU 21 determines whether conference information has been received from the conference server 50 via the network N. Here, the conference information is information necessary for the conference terminal 10 having transmitted the conference participation request to participate in the remote conference and is transmitted by performing the processes of steps S101 to S103 (to be described below) in the conference server 50. Also, the conference information includes attribute information indicating an attribute of the conference terminal 10. In a case where the conference information has been received ("YES" in step S2), the process of the CPU 21 proceeds to step S3. Meanwhile, in a case where the conference information has not been received ("NO" in step S2), the CPU 21 waits for the conference information to be received.

In the present illustrative embodiment, as an example, the attribute information indicates whether the conference terminal 10 has host authority. The host authority is attribute information which is given to a conference terminal 10 hosting the remote conference. The conference terminal 10 having the host authority allows a variety of operations such as a switching operation between necessity and unnecessity of saving media data related to the remote conference and changes of display and output setting of other conference terminals 10.

Figure 5:
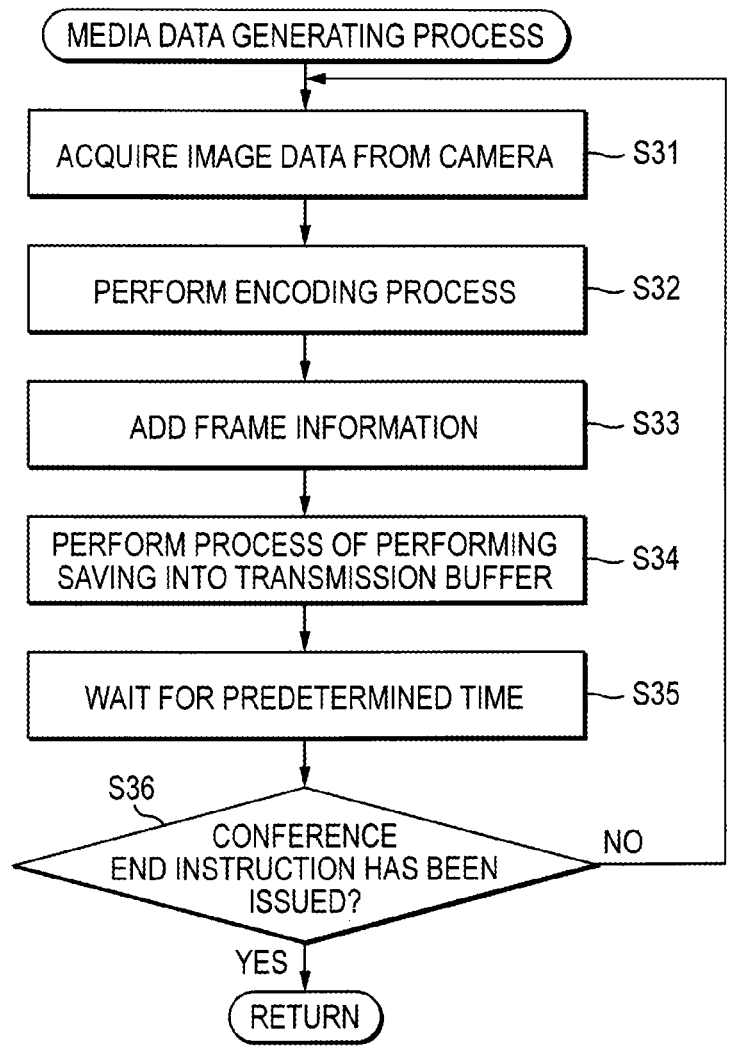
FIG. 5 is a flow chart illustrating a media data generating program of the conference terminal.

When the CPU 21 proceeds to step S3, the CPU 21 starts to execute the media data generating program (to be described below) (see FIG. 5). Specifically, based on images acquired by the camera 33 and sounds acquired by the microphone 34, the CPU 21 generates media data in real time at constant time intervals. The media data generated according to the media data generating program is stored together with information indicating the generation time of the media data in the transmission buffer 23A at any time. After the generation of the media data starts, the process of the CPU 21 proceeds to step S4.

In step S4, based on an operation on the operation unit 31, the CPU 21 determines whether a conference end instruction has been issued. The conference end instruction is an instruction indicating the intention of the conference participant of the conference terminal 10 to finish the participation in the remote conference. For example, the conference end instruction may be transmitted from the operation unit 31 to the CPU 21 according to an operation of the user on the operation unit 31 of the conference terminal 10. In a case where a conference end instruction has been issued ("YES" in step S4), the process of the CPU 21 proceeds to step S16. Meanwhile, in a case where the participation in the remote conference is maintained without any conference end instruction ("NO" in step S4), the process of the CPU 21 proceeds to step S5.

First, the processes of step S5 and the subsequent steps in a case of maintaining the participation in the remote conference will be described. In step S5, the CPU 21 determines whether there is any media data, generated in real time according to the media data generating program (see FIG. 5), inside the transmission buffer 23A. In a case where there is media data in the transmission buffer 23A ("YES" in step S5), the process of the CPU 21 proceeds to step S6. Meanwhile, in a case where there is no media data in the transmission buffer 23A ("NO" in step S5), the process of the CPU 21 proceeds to step S7.

In step S6, the CPU 21 acquires media data, whose generation time is the earliest, of the media data stored in the transmission buffer 23A, from the transmission buffer 23A, and sets the acquired media data as a candidate to be transmitted to the conference server 50. After the media data which is a transmission object candidate is acquired from the transmission buffer 23A, the process of the CPU 21 proceeds to step S8.

When the CPU 21 proceeds to step S7, the CPU 21 uses the communicating unit 36 to packetize missing media data, stored in the missing-media-data holding area 23B, by a missing-media-data storing process (step S11), thereby generating missing media packets, and transmit the missing media packets together with the conference ID and the user ID to the conference server 50 via the network N. The CPU 21 deletes the transmitted missing media data from the missing-media-data holding area 23B. After the missing media packets are transmitted to the conference server 50, the process of the CPU 21 returns to step S4.

Here, the process of step S7 to transmit missing media packets is performed in a case where there is no media data in the transmission buffer 23A ("NO" in step S5). Here, according to the process of step S34 (to be described below), media data is stored in the transmission buffer 23A in predetermined time intervals. In a case where congestion occurs in the network N, according to the degree of the congestion, there is a possibility that the amount of media data to be stored in the transmission buffer 23A by the process of step S34 will be larger than the amount of media data to be transmitted from the transmission buffer 23A, for example, due to control of a TCP protocol or the like on the congestion, an missed-packet retransmission request, or the like. Meanwhile, the case where there is no media data in the transmission buffer 23A means a state in which the transmission speed of media data from the transmission buffer 23A to the conference server 50 is higher than the speed at which media data is generated in real time according to the media data generating program (see FIG. 5) and is stored in the transmission buffer 23A at any time. That is, it is possible to indirectly determine whether the degree of congestion is equal to or lower than a predetermined degree, or not, by determining whether the amount media data stored in the transmission buffer 23A is equal to or less than a predetermined amount, or not. In the present illustrative embodiment, in a case where there is no media data stored in the transmission buffer 23A, it is determined that the degree of congestion is equal to or lower than the predetermined degree, or not. That is, the process of step S7 to transmit missing media packets is performed in a case where the degree of congestion in the network N between the conference terminal 10 and the conference server 50 is equal to or lower than the predetermined degree, or not. In other words, in the present illustrative embodiment, as an example of determination on whether a state of the network N satisfies a predetermined state, determination on whether the degree of congestion is equal to or lower than the predetermined degree, or not is applied.

In step S8, the CPU 21 performs a transmission necessity determining process on the media data acquired as a transmission candidate from the transmission buffer 23A in step S6. Specifically, the CPU 21 executes the transmission necessity determining program (to be described below) (see FIG. 6), thereby determining whether the media data acquired as a transmission candidate needs to be transmitted at that moment. The transmission necessity determining process of step S8 will be described below in detail with reference to FIG. 6. When the transmission necessity determining process of step S8 finishes, the process of the CPU 21 proceeds to step S9.

In step S9, the CPU 21 determines whether the process result of the transmission necessity determining process of step S8 related to the media data acquired as a transmission candidate indicates that it is necessary at that moment to transmit the media data acquired as a transmission candidate. Specifically, the CPU 21 performs the determination of step S9 based on the process result of the transmission necessity determining process of step S8 stored in the RAM 23. In a case where the process result indicates necessity of transmission ("YES" in step S9), the process of the CPU 21 proceeds to step S12. Meanwhile, in a case where the process result does not indicate necessity of transmission but indicates unnecessity of transmission (to be described below) ("NO" in step S9), the process of the CPU 21 proceeds to step S10.

When the CPU 21 proceeds to step S10, based on the attribute information of the conference information received from the conference server 50 in step S2, the CPU 21 determines whether the media data that is determined to not need to be transmitted needs to be saved as missing media data. Specifically, in a case where it has been defined in the attribute information of the conference information that the conference terminal 10 has the host authority, the CPU 21 determines necessity of saving indicating that it is necessary to save the media data that is determined to not need to be transmitted, as missing media data. Meanwhile, in a case where it has been defined in the attribute information that the conference terminal 10 does not have the host authority, the CPU 21 determines unnecessity of saving indicating that it is unnecessary to save the media data that is determined to not need to be transmitted, as missing media data. In the case of determining necessity of saving ("YES" in step S10), the process of the CPU 21 proceeds to step S11. Meanwhile, in the case of determining unnecessity of saving ("NO" in step S10), the CPU 21 discards the media data that is determined to not need to be transmitted, and then the process of the CPU 21 returns to step S4.

Also, in the case where unnecessity of saving is determined in step S10 ("NO" in step S10), the CPU 21 discards the media data that is determined to not need to be transmitted; however, this disclosure is not limited to this aspect. This disclosure is not limited to a process of discarding media data that is determined to not need to be transmitted, but can use a variety of other processes capable of preventing media data that is determined to not need to be transmitted from being transmitted, such as a process of saving media data that is determined to not need to be transmitted, in the HDD 30 of the conference terminal 10.

In a case where unnecessity of transmission is determined ("NO" in step S9) and necessity of saving is determined ("YES" in step S10), in step S11, the CPU 21 performs the missing-media-data storing process on the corresponding media data. In the missing-media-data storing process of step S11, the CPU 21 temporarily stores the media data that is determined to not need to be transmitted ("NO" in step S9)

and determined to need to be saved ("YES" in step S10), as missing media data in the missing-media-data holding area 23B, and deletes the corresponding media data from the transmission buffer 23A. The missing media data stored in the missing-media-data holding area 23B is transmitted to the conference server 50 in the above described step S7, S15, or S18 (to be described below) if the network N provided between the conference terminal 10 and the conference server 50 becomes a little congestion state. When the missing-media-data storing process of step S11 finishes, the process of the CPU 21 returns to step S4.

When the CPU 21 proceeds to step S12, the CPU 21 performs a media data transmitting process. In the media data transmitting process of step S12, the CPU 21 transmits an instruction for packetizing the media data, which is the transmission candidate determined to need to be transmitted, to the communicating unit 36, thereby generating media packets. The CPU 21 transmits the media packets together with the conference ID and the user ID to the conference server 50 via the network N. At this time, the CPU 21 deletes the media data, which is the transmission candidate determined to need to be transmitted, from the transmission buffer 23A. When the media data transmitting process of step S12 finishes, the process of the CPU 21 proceeds to step S13.

In step S13, the CPU 21 performs a missing-media-data transmission possibility determining process. Specifically, the CPU 21 executes the missing-media-data transmission possibility determining program (to be described below) (see FIG. 7), thereby determining whether transmission of missing media data stored in the missing-media-data holding area 23B is possible, based on the state (for example, the degree of congestion) of the network N between the conference terminal 10 and the conference server 50. The missing-media-data transmission possibility determining process of step S13 will be described below in detail with reference to FIG. 7. When the missing-media-data transmission possibility determining process of step S13 finishes, the process of the CPU 21 proceeds to step S14.

In step S14, the CPU 21 determines whether the determination result of the missing-media-data transmission possibility determining process stored in the RAM 23 is "POSSIBLE" indicating that transmission of the missing media data is possible. In a case where the determination result is "POSSIBLE" ("YES" in step S14), the process of the CPU 21 proceeds to step S15. Meanwhile, in a case where the determination result of the missing-media-data transmission possibility determining process is not "POSSIBLE" ("NO" in step S14), the process of the CPU 21 returns to step S4.

When the CPU 21 proceeds to step S15, similarly in step S7, the CPU 21 uses the communicating unit 36 to packetize the missing media data, stored in the missing-media-data holding area 23B, by a missing-media-data storing process (step S11), thereby generating missing media packets, and transmit the missing media packets together with the conference ID and the user ID to the conference server 50 via the network N. The CPU 21 deletes the transmitted missing media data from the missing-media-data holding area 23B. After the missing media packets are transmitted to the conference server 50, the process of the CPU 21 returns to step S4.

Also, the missing-media-data transmitting process of step S15 is performed in the case where the determination result of the missing-media-data transmission possibility determining process indicates that transmission is possible. This case also means the state in which the transmission speed of media data from the transmission buffer 23A to the conference server 50 is higher than the speed at which media data is generated in real time according to the media data generating program (see FIG. 5) and is stored in the transmission buffer 23A at any time. That is, the missing-media-data transmitting process of step S15 is performed in a case where the degree of congestion in the network N between the conference terminal 10 and the conference server 50 is equal to or lower than the predetermined degree.

Subsequently, the processes of step S16 and the subsequent steps in a case of finishing the participation in the remote conference will be described. As described above, the process of step S16 is performed in a case where the conference end instruction is issued in the conference terminal 10 ("YES" in step S4). In step S16, based on the issuing of the conference end instruction, the CPU 21 stops the conference terminal 10 from generating media data. Specifically, the CPU 21 stops the execution of the media data generating program having started in step S3. After generation of media data stops, the process of the CPU 21 proceeds to step S17.

In step S17, the CPU 21 determines whether there is any missing media data stored in the missing-media-data holding area 23B at that moment. In a case where there is missing media data stored in the missing-media-data holding area 23B ("YES" in step S17), the process of the CPU 21 proceeds to step S18. Meanwhile, in a case where there is no missing media data in the missing-media-data holding area 23B ("NO" in step S17), the process of the CPU 21 proceeds to step S19.

In step S18, the CPU 21 uses the communicating unit 36 to packetize all missing media data in the missing-media-data holding area 23B and transmit all missing media packets together with the conference ID and the user ID to the conference server 50. The CPU 21 deletes all of the transmitted missing media data from the missing-media-data holding area 23B. After all missing media data is transmitted to the conference server 50, the process of the CPU 21 proceeds to step S19.

Also, the missing-media-packet transmitting process of step S18 is performed after real time generation and transmission of media data stops according to the conference end instruction. In this case, since transmission of media data generated in real time is not performed, the network N between the conference terminal 10 and the conference server 50 becomes an uncongested state. That is, the missing-media-packet transmitting process of step S18 is performed in a state in which the network N between the conference terminal 10 and the conference server 50 is uncongested.

In step S19, based on the issuing of the conference end instruction, the CPU 21 transmits an conference leaving instruction to the conference server 50 via the network N. The conference leaving instruction is an instruction for actually stopping the participation of the participant in the remote conference, and includes the conference ID and the user ID. After the conference leaving instruction is transmitted, the process of the CPU 21 proceeds to step S20.

In step S20, the CPU 21 determines whether a leaving completion notification has been received from the conference server 50 via the network N. Here, the leaving completion notification indicates that a process necessary for the conference server (50) side to stop the participation of the conference terminal 10 which transmitted the conference leaving instruction has been completed, and the conference server 50 performs the process of step S113 (to be described below), thereby transmitting the leaving completion notification. In a case where the leaving completion notification has been received ("YES" in step S20), the CPU 21 finishes the main control program. Meanwhile, in a case where the leaving completion notification has not been received ("NO" in step S20), the CPU 21 waits for the leaving completion notification to be received.

(Media Data Generating Program of Conference Terminal)

Subsequently, the media data generating program of a conference terminal 10 configuring the remote conference saving system 1 will be described in detail with reference to FIG. 5. The media data generating program is executed by the CPU 21 such that media data is generated in real time at constant time intervals at the time of performing a remote conference (that is, between steps S3 and S16).

Also, in the following description, a case of generating media data based on images acquired by the camera 33 of the conference terminal 10 will be described as an example. However, even in a case of generating media data based on sounds acquired by the microphone 34, the same process as will be described can be used to generate media data. In a case of generating media data including images and sounds, two media data generating programs (that is, a program for images and a program for sounds) can be executed at the same time.

When generation of media data starts in step S3 such that execution of the media data generating program starts, first, in step S31, the CPU 21 acquires data on images acquired by the camera 33 of the conference terminal 10, from the camera 33. After the image data is acquired, the process of the CPU 21 proceeds to step S32.

When the CPU 21 proceeds to step S32, the CPU 21 performs an encoding process on the acquired image data. Specifically, the CPU 21 encodes the acquired image data into a predetermined image format, thereby generating media data of one frame. After the encoding process is performed, the process of the CPU 21 proceeds to step S33. As the image format, for example, H.261, H263, and the like defined by H.323 may be applied.

In step S33, the CPU 21 adds frame information to the media data of one frame encoded by the encoding process. The frame information is configured to include the number and generation time of the corresponding frame. The frame number is a number assigned in ascending order from the time of start of image acquisition and indicates the order of the generated frame. That is, the frame number is an example of identification information indicating the order of temporal position of the corresponding media data in media data. The generation time indicates the generation time of the media data of the corresponding frame. The frame information is stored, for example, in the header of the media data of the corresponding frame. After the frame information is added, the process of the CPU 21 proceeds to step S34.

In step S34, the CPU 21 performs a transmission buffer storing process. In the transmission buffer storing process, the CPU 21 stores the media data of each frame with the frame information added thereto, in the transmission buffer 23A. After the media data of one frame is stored in the transmission buffer 23A, the process of the CPU 21 proceeds to step S35.

In step S35, the CPU 21 waits for a predetermined time to elapse from the storage time of the media data into the transmission buffer 23A. Here, the predetermined time is a time determined according to a frame rate. For example, in a case of 15 fps, the predetermined time is set to 1/15 sec (that is, 66.6 msec). When the predetermined time elapses, the process of the CPU 21 proceeds to step S36.

In step S36, based on an operation on the operation unit 31, the CPU 21 determines whether a conference end instruction has been issued. In a case where a conference end instruction has been issued ("YES" in step S36), the CPU 21 finishes the media data generating program. Therefore, if a conference end instruction is issued ("YES" in step S4, or "YES" in step S36), since the media data generating program finishes, real time generation of media data of the conference terminal 10 is stopped in step S16. Meanwhile, in a case where there is no conference end instruction and the remote conference is continued ("NO" in step S36), the process of the CPU 21 returns to step S31.

As described above, in the conference terminal 10, while the remote conference is being performed, since the media data generating program is executed, media data of frame units are generated in real time at predetermined time intervals, and are stored in the transmission buffer 23A at any time.

(Transmission Necessity Determining Program of Conference Terminal)

Subsequently, the transmission necessity determining program which is executed in the transmission necessity determining process of step S8 in the conference terminal 10 will be described in detail with reference to FIG. 6. As described above, when the CPU 21 proceeds to the transmission necessity determining process of step S8, the CPU 21 executes the transmission necessity determining program, thereby determining whether it is necessary to transmit media data which is a transmission candidate at that moment.

Figure 6:
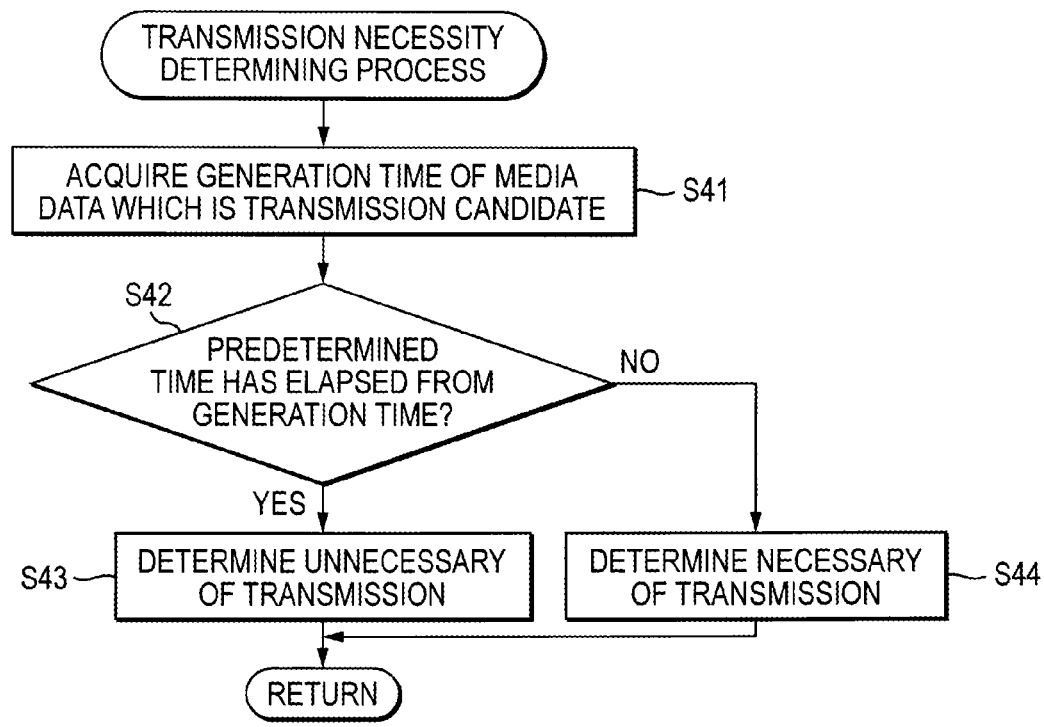
FIG. 6 is a flow chart illustrating a transmission necessity determining program of the conference terminal.

As shown in FIG. 6, when the CPU 21 proceeds to step S41, the CPU 21 acquires the generation time of media data set as a transmission candidate. Specifically, with reference to frame information added to the header of the media data, the CPU 21 acquires the generation time included in the frame information. After the generation time of the media data related to the transmission candidate is acquired, the process of the CPU 21 proceeds to step S42.

In step S42, the CPU 21 determines whether a predetermined time has elapsed from the generation time of the media data related to the transmission candidate at that moment. Here, the predetermined time is a time predetermined as conference information or system, and the predetermined time means a maximum delay time that is allowable in transmission and reception of media data in proceeding with the remote conference. The media data set as a transmission candidate is media data, whose generation time is the earliest, of media data stored in the transmission buffer 23A (step_S6). As a network state in which the media data set as the transmission candidate has not been transmitted for the predetermined time or more, a case where congestion has occurred in the network N between the conference terminal 10 and the conference server 50 can be exemplified. In a case where occurrence of congestion causes the amount of media data to be stored in the transmission buffer 23A by the process of step S34 to be larger than the amount of media data to be transmitted from the transmission buffer 23A as described above, the staying time of media data in the transmission buffer 23A lengthens. In a case where the degree of congestion is equal to or higher than the predetermined degree, the staying time of media data in the transmission buffer 23A becomes equal to or longer than a predetermined time. That is, it is determined whether the predetermined time has elapsed from the generation time of the media data related to the transmission candidate, whereby it is indirectly determined whether the degree of congestion is equal to or higher than the predetermined degree, or not. In other words, in the present illustrative embodiment, as an example of the state of the network N, the generation time of the media data related to the transmission candidate is referred to. In a case where the predetermined time has elapsed from the generation time of the media data related to the transmission candidate ("YES" in step S42), the process of the CPU 21 proceeds to step S43. Meanwhile, in a case where the predetermined time has not elapsed from the generation time of the media data related to the transmission candidate ("NO" in step S42), the process of the CPU 21 proceeds to step S44.

In step S43, the CPU 21 determines "UNNECESSARY OF TRANSMISSION" as the result of the determination on the media data related to the transmission candidate, and saves the determination result in the RAM 23. In a case where the CPU 21 proceeds to the process of step S43, since the predetermined time has elapsed from the generation time of the media data related to the transmission candidate, even if the media data is transmitted, the media data is delayed by a degree which is not allowable in proceeding with the remote conference, and thus the real-time property is seriously damaged. Therefore, the CPU 21 determines "UNNECESSARY OF TRANSMISSION" as the result of the determination on the media data related to the transmission candidate. After the determination result indicating "UNNECESSARY OF TRANSMISSION" is stored in the RAM 23, the CPU 21 finishes the transmission necessity determining program, and the process of the CPU 21 proceeds to step S9 of the main control program shown in FIG. 4.

In step S44, the CPU 21 determines "NECESSARY OF TRANSMISSION" as the result of the determination on the media data related to the transmission candidate, and saves the determination result in the RAM 23. In a case where the CPU 21 proceeds to the process of step S44, since the predetermined time has not elapsed from the generation time of the media data related to the transmission candidate, if the media data is transmitted, the media data indicating the actual situation of the remote conference substantially in real time is transmitted. Therefore, the CPU 21 determines "NECESSARY OF TRANSMISSION" as the result of the determination on the media data related to the transmission candidate.

After the determination result indicating "NECESSARY OF TRANSMISSION" is stored in the RAM 23, the CPU 21 finishes the transmission necessity determining program, and the process of the CPU 21 proceeds to step S9 of the main control program shown in FIG. 4.

(Missing-Media-Data Transmission Possibility Determining Program of Conference Terminal)

Subsequently, the missing-media-data transmission possibility determining program which is executed in the missing-media-data transmission possibility determining process of step S13 in a conference terminal 10 will be described in detail with reference to FIG. 7. As described above, when the CPU 21 proceeds to the missing-media-data transmission possibility determining process of step S13, the CPU 21 executes the missing-media-data transmission possibility determining program, thereby determining whether transmission of missing media data in the missing-media-data holding area 23B is possible, based on the state (for example, the degree of congestion) of the network N between the conference terminal 10 and the conference server 50.

Figure 7:
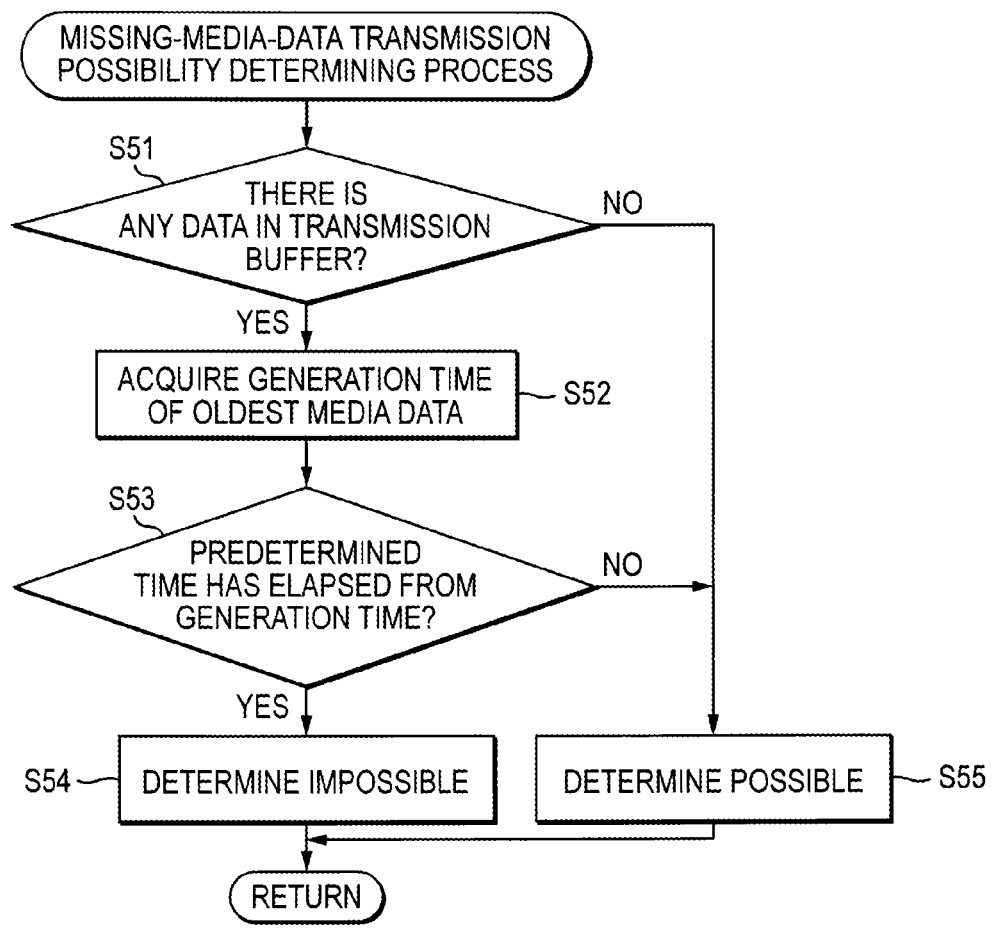
FIG. 7 is a flow chart illustrating a missing-media-data transmission possibility determining program of the conference terminal.

As shown in FIG. 7, when the CPU 21 proceeds to step S51, first, the CPU 21 determines whether any media data generated in real time according to the media data generating program (see FIG. 5) exists in the transmission buffer 23A. In a case where there is media data in the transmission buffer 23A ("YES" in step S51), the process of the CPU 21 proceeds to step S52. Meanwhile, in a case where there is no media data in the transmission buffer 23A ("NO" in step S51), the process of the CPU 21 proceeds to step S55.

When the CPU 21 proceeds to step S52, the CPU 21 acquires the generation time of media data, corresponding to the oldest frame, of the media data stored in the transmission buffer 23A. Specifically, based on frame information items added to the headers of the media data stored in the transmission buffer 23A, the CPU 21 specifies the oldest media data, and acquires the generation time of the oldest media data. After the generation time of the oldest media data is acquired, the process of the CPU 21 proceeds to step S53.

In step S53, the CPU 21 determines whether a predetermined time has elapsed from the generation time of the oldest media data acquired in step S52. The predetermined time of step S53 is determined according to a time predetermined as conference information or system and is, for example, 300 msec. In a case where the predetermined time has elapsed from the generation time of the oldest media data ("YES" in step S53), the process of the CPU 21 proceeds to step S54. Meanwhile, in a case where the predetermined time has not elapsed from the generation time of the oldest media data ("NO" in step S53), the process of the CPU 21 proceeds to step S55.

In step S54, the CPU 21 determines "IMPOSSIBLE" indicating that transmission of missing media data is impossible, as the determination result of the missing-media-data transmission possibility determining process. In a case where the CPU 21 proceeds to step S54, since the predetermined time has elapsed from the generation time of the oldest media data, there is media data, which needs to be transmitted in real time, remained in the transmission buffer 23A. Therefore, it is possible to determine that the degree of congestion in the network N between the conference terminal 10 and the conference server 50 is equal to or higher than the predetermined degree, and thus the CPU 21 determines "UNNECESSARY" with respect to transmission of the missing media data. After the determination result of the missing-media-data transmission possibility determining process is stored in the RAM 23, the CPU 21 finishes the missing-media-data transmission possibility determining program, and the process of the CPU 21 proceeds to step S14 of the main control program shown in FIG. 4.

In step S55, the CPU 21 determines "POSSIBLE" indicating that transmission of the missing media data is possible, as the determination result of the missing-media-data transmission possibility determining process. After the determination result of the missing-media-data transmission possibility determining process is stored in the RAM 23, the CPU 21 finishes the missing-media-data transmission possibility determining program, and the process of the CPU 21 proceeds to step S14 of the main control program shown in FIG. 4.

Cases of proceeding to step S55 are a case where there is no media data in the transmission buffer 23A ("NO" in step S51), and a case where the predetermined time has not elapsed from the generation time of the oldest media data ("NO" in step S53). Here, the case where there is no media data in the transmission buffer 23A means a state in which the transmission speed of media data from the transmission buffer 23A to the conference server 50 is higher than the speed at which media data generated in real time according to the media data generating program (see FIG. 5) is stored in the transmission buffer 23A. Therefore, in this case, it is possible to determine that congestion has not occurred in the network N between the conference terminal 10 and the conference server 50. That is, since transmission of the missing media data hardly influences the progress of the remote conference, the CPU 21 determines "POSSIBLE" as the determination result.

The case where the predetermined time has not elapsed from the generation time of the oldest media data ("NO" in step S53) means a state in which the staying time of media data in the transmission buffer 23A is short, and thus it is possible to determine that the degree of congestion in the network N is a degree at which it is possible to immediately transmit the media data in the transmission buffer 23A. That is, even in this case, since it can be considered that transmission of the missing media data hardly influences the progress of the remote conference, the CPU 21 determines "POSSIBLE" as the determination result.

(Main Control Program of Conference Server)

Subsequently, the main control program of the conference server 50 configuring the remote conference saving system 1 according to the present illustrative embodiment will be described in detail with reference to FIG. 8. As described above, the main control program shown in FIG. 8 is stored in the HDD 66 of the conference server 50 and is executed by the CPU 61.

Figure 8:
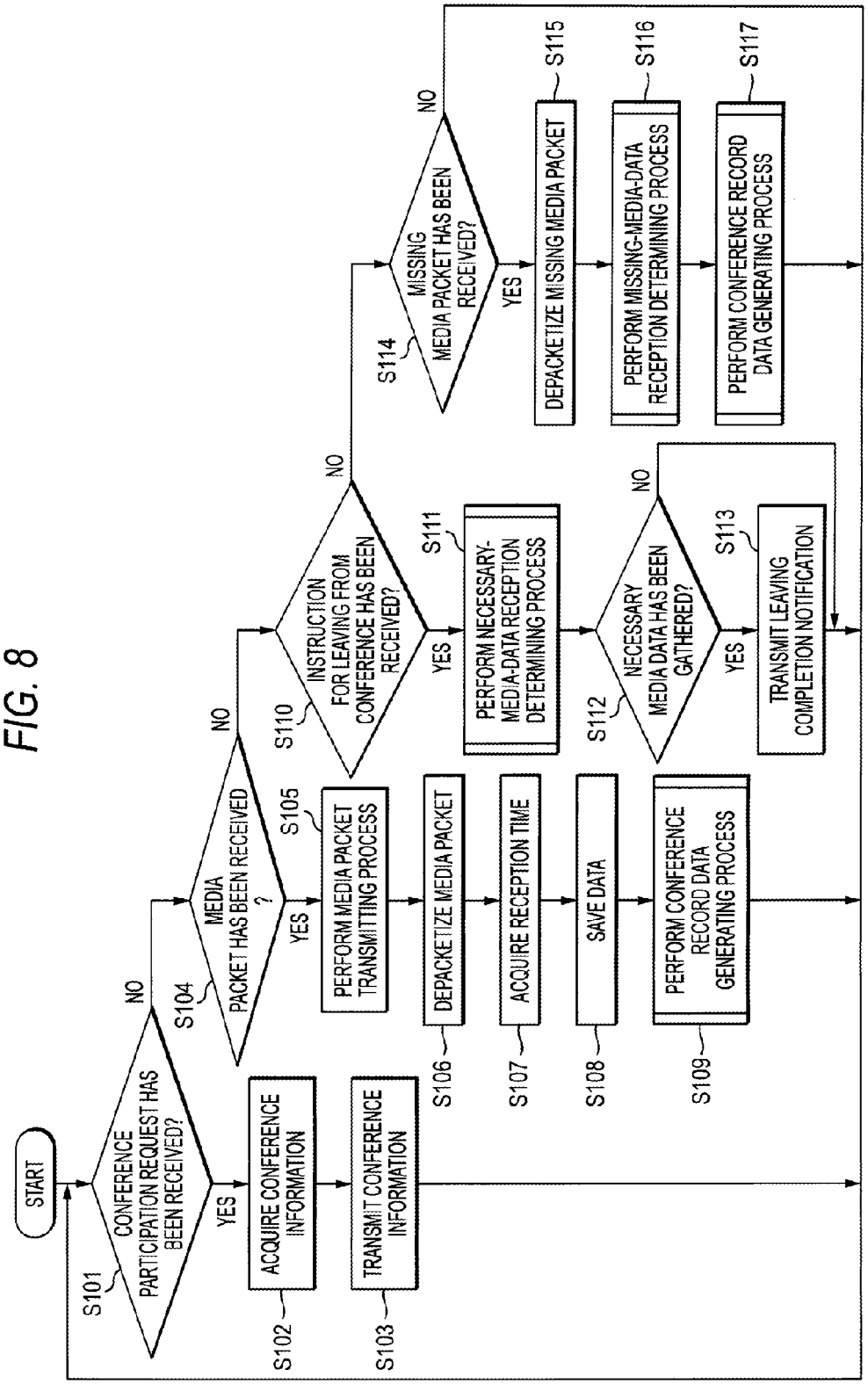
FIG. 8 is a flow chart illustrating a main control program of the conference server.

As shown in FIG. 8, if execution of the main control program starts and the CPU 61 proceeds to step S101, the CPU 61 determines whether any conference participation request has been received via the network N. As described above, a conference participation request is transmitted from step S1 of each conference terminal 10 configuring the remote conference saving system 1, to the conference server 50. In a case where a conference participation request has been received ("YES" in step S101), the process of the CPU 61 proceeds to step S102. Meanwhile, in a case where any conference participation request has not been received ("NO" in step S101), the process of the CPU 61 proceeds to step S104.

In step S102, based on the received conference participation request, the CPU 61 acquires conference information. Specifically, the CPU 61 specifies a remote conference in which it has been requested to participate, based on the conference ID included in the conference participation request, and determines whether it is possible to participate in the specified remote conference, according to a user ID and a conference password included in the conference participation request. Then, in a case of allowing participation in the remote conference, the CPU 61 determines existence or non-existence of host authority with respect to the conference terminal 10 having transmitted the conference participation request, based on the user ID. When conference information based on the results of the above described processes is acquired, the process of the CPU 61 proceeds to step S103. Also, if participation in the remote conference is allowed, the CPU 61 stores the user ID included in the conference participation request, in association with the conference ID included in the conference participation request, and existence or non-existence of the host authority, in the RAM 63.

In step S103, the CPU 61 transmits the conference information acquired in step S102, to the conference terminal 10 having transmitted the conference participation request, via the network N. After the conference information is transmitted, the process of the CPU 61 returns to step S101.

In step S104, the CPU 61 determines whether any media packet has been received from the conference terminals 10 configuring the remote conference saving system 1, via the network N. Here, the media packet means a packet transmitted substantially in real time in the media data transmitting process of step S12 in each conference terminal 10. In a case where a media packet has been received ("YES" in step S104), the process of the CPU 61 proceeds to step S105. Meanwhile, in a case where any media packet has not been received ("NO" in step S104), the process of the CPU 61 proceeds to step S110.

When the CPU 61 proceeds to step S105, the CPU 61 performs a media packet transmitting process. In the media packet transmitting process of step S105, with reference to user IDs stored in association with the conference ID in the RAM 63, the CPU 61 transmits the received media packet to other conference terminals 10 participating in the same remote conference as that of the conference terminal 10 of the user ID of the transmission source of the media packet, via the network N. When the media packet transmitting process of step S105 finishes, the process of the CPU 61 proceeds to step S106.

In step S106, the CPU 61 controls the communicating unit 67, thereby depacketizing the received media packet. The media packet is depacketized into media data of one frame. When the depacketization of the media packet finishes, the process of the CPU 61 proceeds to step S107.

In step S107, the CPU 61 uses a clocking mechanism of the OS to acquire the reception time of the media packet received in step S104. The reception time is associated with the media data of one frame obtained by depacketizing the media packet. After the reception time is acquired, the process of the CPU 61 proceeds to step S108.

In step S108, the CPU 61 stores the media data of one frame obtained by depacketizing the media packet received in step S104, together with the reception time acquired in step S107 and the user ID of the conference terminal 10 which is the transmission source of the media packet, in association with one another, in the media data storage area 66A. Thereafter, the process of the CPU 61 proceeds to step S109.

When the CPU 61 proceeds to step S109, the CPU 61 performs a conference record data generating process. In the conference record data generating process of step S109, the CPU 61 executes the conference record data generating program (to be described below) (see FIG. 9), thereby generating media data indicating the situation of the remote conference, based on the media packets and missing media packets received from each conference terminal 10, and saving the generated media data as conference record data in the conference record data storage area 66C. Thereafter, the process of the CPU 61 returns to step S101.

In step S110, the CPU 61 determines whether a conference leaving instruction has been received from the conference terminals 10 via the network N. The conference leaving instruction is transmitted to the conference server 50 in step S19 of each conference terminal 10 configuring the remote conference saving system 1. In a case where the conference leaving instruction has been received ("YES" in step S110), the process of the CPU 61 proceeds to step S111. Meanwhile, in case where the conference leaving instruction has not been received ("NO" in step S110), the process of the CPU 61 proceeds to step S114.

In step S111, the CPU 61 performs a necessary-media-data reception determining process. In the necessary-media-data reception determining process of step S111, the CPU 61 executes a necessary-media-data reception determining program (see FIG. 10), thereby determining whether media data necessary to generate conference record data indicating the situation from start to end of the remote conference (hereinafter, referred to as necessary media data) has been received. The contents of the necessary-media-data reception determining process of step S111 will be described below in detail with reference to the figure. When the necessary-media-data reception determining process of step S111 finishes, the process of the CPU 61 proceeds to step S112.

When the CPU 61 proceeds to step S112, based on the process result of the necessary-media-data reception determining process of step S111, the CPU 61 determines whether the necessary media data has been gathered. In a case where the necessary media data has been gathered ("YES" in step S112), the process of the CPU 61 proceeds to step S113. Meanwhile, in a case where the necessary media data has not been gathered ("NO" in step S112), the process of the CPU 61 returns to step S101.

Since all missing media data of the conference terminal 10 having transmitted the conference leaving instruction has been received by the conference server 50, in step S113, the CPU 61 transmits a leaving completion notification to the conference terminal 10. Next, the CPU 61 deletes the user ID of the conference terminal 10 having transmitted the conference leaving instruction, from the RAM 63. After the leaving completion notification is transmitted, the process of the CPU 61 returns to step S101.

In step S114, the CPU 61 determines whether any missing media packet has been received from the conference terminals 10 configuring the remote conference saving system 1, via the network N. A missing media packet is a packet obtained by packetizing missing media data read from the missing-media-data holding area 23B of each conference terminal 10 and transmitted according to the process of step S7, S15, or S18 of each conference terminal 10. In a case where a missing media packet has been received ("YES" in step S114), the process of the CPU 61 proceeds to step S115. Meanwhile, in a case where any missing media packet has not been received ("NO" in step S114), the process of the CPU 61 returns to step S101.

In step S115, the CPU 61 controls the communicating unit 67, thereby depacketizing the received missing media packet. The missing media packet is depacketized into media data of one frame which had been stored as missing media data in the missing-media-data holding area 23B. When the depacketization of the missing media packet finishes, the process of the CPU 61 proceeds to step S116.

When the CPU 61 proceeds to step S116, the CPU 61 performs a missing-media-data reception determining process. In the missing-media-data reception determining process of step S116, the CPU 61 executes the missing-media-data reception determining program (to be described below) (see FIG. 11), thereby performing saving of the missing media data obtained by depacketizing the missing media packet, confirmation of reception of necessary media data, and so on. The contents of the missing-media-data reception determining process of step S116 will be described below in detail with reference to FIG. 11. When the missing-media-data reception determining process of step S116 finishes, the process of the CPU 61 proceeds to step S117.

In step S117, the CPU 61 performs a conference record data generating process. In the conference record data generating process of step S117, similarly in step S109, the CPU 61 executes the conference record data generating program (to be described below) (see FIG. 9), thereby generating media data indicating the situation of the remote conference, based on media packets and missing media packets received from each conference terminal 10 participating in the remote conference, and also saving the generated media data as conference record data in the conference record data storage area 66C. Thereafter, the process of the CPU 61 returns to step S101.

(Conference Record Data Generating Program of Conference Server)

Subsequently, the conference record data generating program which is executed in the conference record data generating process of step S109 or S117 in the conference server 50 will be described in detail with reference to FIG. 9. At any time media data is gathered, the CPU 61 of the conference server 50 executes the conference record data generating program, thereby combining media data, such that conference record data representing the situation from start to end of the remote conference is generated.

Figure 9:
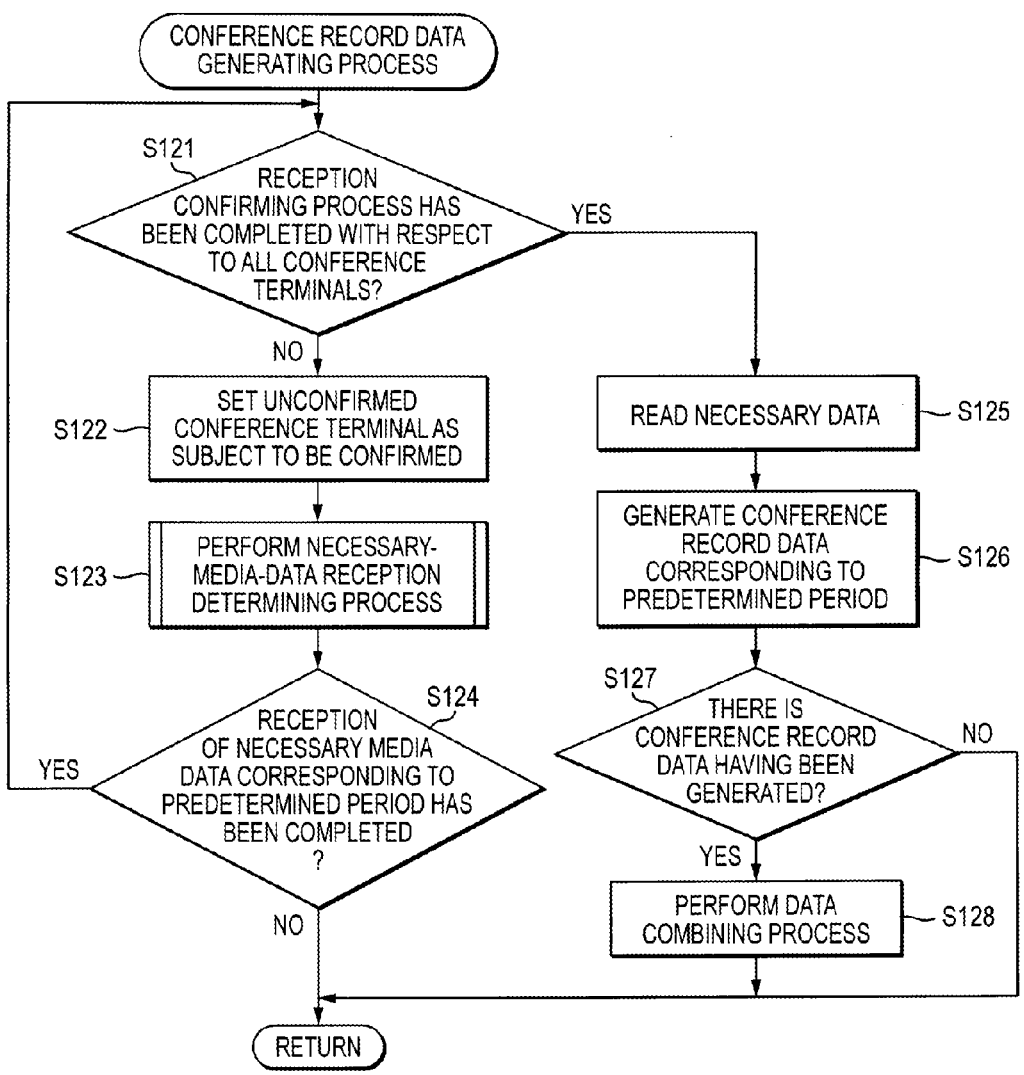
FIG. 9 is a flow chart illustrating a conference record data generating program of the conference server.

As shown in FIG. 9, when the CPU 61 proceeds to the conference record data generating process of step S109 or S117, first, in step S121, based on information, indicating completion of a reception confirming process, stored in the RAM 63, the CPU 61 determines whether the reception confirming process (steps S122 to S124 to be described below) has been completed with respect to all conference terminals 10 participating in the remote conference. In a case where the reception confirming process has been completed with respect to all conference terminals 10 ("YES" in step S121), the process of the CPU 61 proceeds to step S125. Meanwhile, in a case where the reception confirming process has not been completed with respect to all conference terminals 10 ("NO" in step S121), the process of the CPU 61 proceeds to step S122.

Here, the contents of the reception confirming process (steps S122 to S124) on the conference terminals 10 will be described. First, in step S122, the CPU 61 sets a conference terminal 10 on which the reception confirming process has not been performed yet, as a subject to be confirmed. After an unconfirmed conference terminal 10 is set as a subject to be confirmed, the process of the CPU 61 proceeds to step S123.

When the CPU 61 proceeds to step S123, the CPU 61 performs the necessary-media-data reception determining process on the conference terminal 10 set as a subject to be confirmed. In the necessary-media-data reception determining process of step S123, the CPU 122 executes the necessary-media-data reception determining program (see FIG. 10), thereby determining necessary media data has been received from the conference terminal 10 set as a subject to be confirmed. The contents of the necessary-media-data reception determining process of step S123 will be described below in detail with reference to FIG. 10. When the necessary-media-data reception determining process of step S123 finishes, the process of the CPU 61 proceeds to step S124.

In step S124, based on the process result of the necessary-media-data reception determining process of step S123, the CPU 61 determines whether necessary media data corresponding to a predetermined period has been received. In a case where necessary media data corresponding to the predetermined period has been received ("YES" in step S124), the CPU 61 saves information indicating that the reception confirming process has been completed on the corresponding conference terminal 10, in association with the user ID, in the RAM 63, and the process of the CPU 61 returns to step S121. Meanwhile, in a case where necessary media data corresponding to the predetermined period has not been received ("NO" in step S124), the CPU 61 finishes the conference record data generating program.

Subsequently, the process contents (steps S125 to S128) in a case where the reception confirming process has been completed on all conference terminals 10 participating in the remote conference and necessary media data corresponding to the predetermined period and transmitted from all conference terminals 10 has been gathered will be described. In step S125, the CPU 61 reads the necessary media data, corresponding to the predetermined period and transmitted from all conference terminals 10, from the media data storage area 66A and the missing-media-data storage area 66B. Specifically, the CPU 61 reads necessary media data corresponding to the predetermined period and transmitted from the conference terminals 10 of all user IDs associated with the conference ID indicating the remote conference being in progress, from the media data storage area 66A and the missing-media-data storage area 66B. Thereafter, the process of the CPU 61 proceeds to step S126.

In step S126, based on the necessary media data read from the media data storage area 66A and the missing-media-data storage area 66B, the CPU 61 generates media data indicating the situation of the remote conference corresponding to the predetermined period, as conference record data corresponding to the predetermined period. Thereafter, the process of the CPU 61 proceeds to step S127.

When the CPU 61 proceeds to step S127, with reference to the conference record data storage area 66C, the CPU 61 determines whether there is conference record data having been generated. Here, the conference record data having been generated means the contents of the remote conference up to right before the conference record data generated to correspond to the predetermined period in step S126. In other words, it is determined whether there is conference record data having the conference ID indicating the remote conference being in progress, in the conference record data storage area 66C. In a case where there is conference record data having been generated ("YES" in step S127), the process of the CPU 61 proceeds to step S128. Meanwhile, in a case where there is no conference record data having been generated ("NO" in step S127), the CPU 61 saves the conference record data generated to correspond to the predetermined period in step S126, in association with the conference ID indicating the remote conference being in progress, in the conference record data storage area 66C, and finishes the conference record data generating program.

In step S128, the CPU 61 performs a data combining process. In the data combining process of step S128, the CPU 61 couples the conference record data generated to correspond to the predetermined period in step S126, to the end of the generated conference record data specified in step S127. The coupled conference record data is saved in the conference record data storage area 66C, and then the CPU 61 finishes the conference record data generating program.

(Necessary-Media-Data Reception Determining Program of Conference Server)

Subsequently, the necessary-media-data reception determining program which is executed in the necessary-media-data reception determining process of step S111, S123, or S143) in the conference server 50 will be described in detail with reference to FIG. 10. The CPU 61 executes the necessary-media-data reception determining program to determine whether necessary media data has been received, whereby unreceived missing media data is specified and it is determined whether the specified missing media data corresponds to necessary media data.

Figure 10:
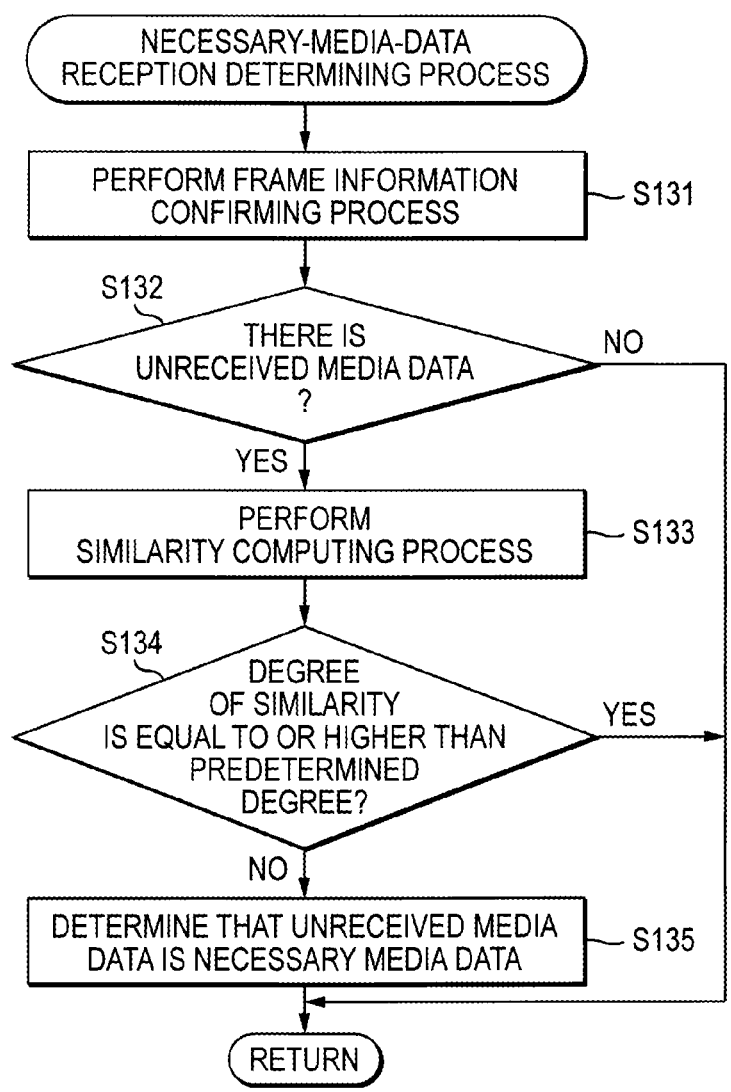
FIG. 10 is a flow chart illustrating a necessary-media-data reception determining program of the conference server.

As shown in FIG. 10, in step S131, the CPU 61 performs a frame information confirming process. In the frame information confirming process of step S131, the CPU 61 specifies unreceived media data of one frame with reference to the frame information received together with the media data and the missing media data stored in the media data storage area 66A and the missing-media-data storage area 66B. As described above, the frame information includes a frame number, and a frame number is assigned in order of generation of media data corresponding to each frame. Therefore, if the frame number included in the frame information is referred to, it is possible to specify unreceived media data of one frame. When the frame information confirming process of step S131 finishes, the process of the CPU 61 proceeds to step S132.

When the CPU 61 proceeds to step S132, based on the process result of the frame information confirming process, the CPU 61 determines whether there is any unreceived media data of one frame. In a case where there is unreceived media data of one frame ("YES" in step S132), the process of the CPU 61 proceeds to step S133. Meanwhile, in a case where there is no unreceived media data of one frame ("NO" in step S132), the CPU 61 determines that all of necessary media data has been gathered, and finishes the necessary-media-data reception determining program.

In step S133, the CPU 61 performs a similarity computing process. In the similarity computing process of step S133, the CPU 61 specifies a plurality of media data items, which corresponds to the temporal vicinity of the unreceived media data and each of which corresponds to one frame, based on the frame number included in the frame information, and compares the image contents of the plurality of specified media data items (for example, a media data item related to a frame immediately before the unreceived media data, and a media data item related to a frame immediately after the unreceived media data), thereby computing the degree of similarity between the media data items. Next, the computed degree of similarity is saved in the RAM 63, the process of the CPU 61 proceeds to step S134.

Also, the degree of similarity of the similarity computing process of step S133 indicates the degree of coincidence between the contents of an image and the contents of another image, and the degree increases as the contents of both images are more similar to each other and decreases as the contents of both images are more different from each other. For example, the degree of similarity may be defined as the variance value of differences in pixel values of the same coordinates between an image and another image. Also, the term "temporal vicinity" means, for example, the range of a time scale (about several hundreds msec) capable of analyzing general motions of human beings. Further, the plurality of media data items which is used in the similarity computing process needs only to be in the temporal vicinity of the unreceived media data, and a plurality of media data items corresponding to several frames before the unreceived media data and a plurality of media data items corresponding to several frames after the unreceived media data may be used. Alternatively, media data items related to two consecutive frames immediately before the unreceived media data may be used.

In step S134, the CPU 61 determines whether the degree of similarity computed in the similarity computing process of step S133 is equal to or higher than a predetermined degree, or not. In a case where the degree of similarity is equal to or higher than the predetermined distance ("YES" in step S134), since it can be considered that there is no motion in the image contents in the temporal vicinity of the unreceived media data of one frame, the CPU 61 determines that the unreceived media data of one frame does not correspond to necessary media data, and finishes the necessary-media-data reception determining program. Meanwhile, in a case where the degree of similarity is lower than the predetermined degree ("NO" in step S134), the process of the CPU 61 proceeds to step S135.

In step S135, the CPU 61 determines that the unreceived media data of one frame is necessary media data. As described above, the process of step S135 is performed in the case where the degree of similarity is lower than the predetermined degree ("NO" in step S134). The fact that the degree of similarity is lower than the predetermined degree means that there is a motion corresponding to a predetermined motion amount or greater in the image contents in the temporal vicinity of the unreceived media data of one frame, and thus it is impossible to smoothly reproduce the motion with the unreceived media data of one frame missed. In view of this point, in the case where the degree of similarity is lower than the predetermined degree, it is determined that the unreceived media data of one frame is necessary media data. Thereafter, the CPU 61 finishes the necessary-media-data reception determining program.

(Missing-Media-Data Receiving Program of Conference Server)

Subsequently, the missing-media-data receiving program which is performed in a missing-media-data receiving process of step S116 in the conference server 50 will be described in detail with reference to FIG. 11. The CPU 61 executes the missing-media-data receiving program to perform saving of missing media data obtained by depacketizing missing media packets, confirmation of reception of necessary media data, and so on.

Figure 11:
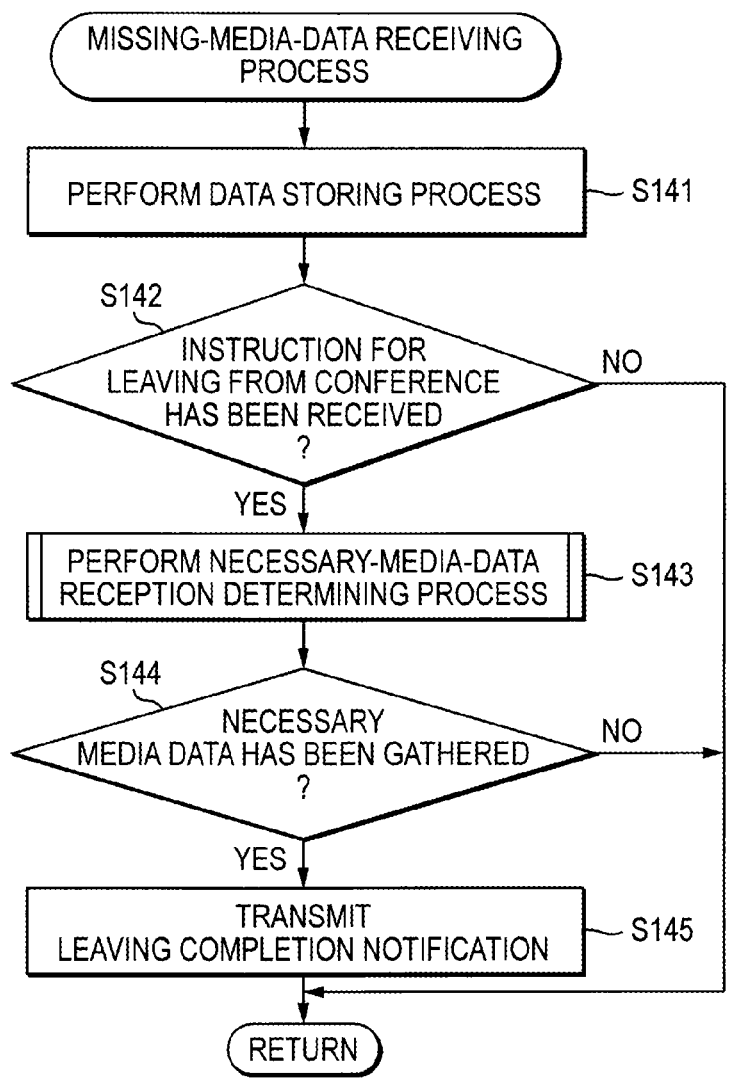
FIG. 11 is a flow chart illustrating a missing-media-data receiving program of the conference server.

As shown in FIG. 11, when the CPU 61 proceeds to the missing-media-data receiving process of step S116, in step S141, the CPU 61 performs a data storing process. In the data storing process of step S141, the CPU 61 saves missing media data of one frame acquired by depacketizing a missing media packet received from a conference terminal 10 in step S115, in the missing-media-data storage area 66B. When the data storing process of step S141 finishes, the process of the CPU 61 proceeds to step S142.

In step S142, the CPU 61 determines whether the conference leaving instruction has been received from the conference terminals 10 participating in the remote conference. In a case where a conference leaving instruction has been received ("YES" in step S142), the process of the CPU 61 proceeds to step S143. Meanwhile, in a case where the conference leaving instruction has not been received ("NO" in step S142), the CPU 61 finishes the missing-media-data receiving program.

When the CPU 61 proceeds to step S143, the CPU 61 performs the necessary-media-data reception determining process on the conference terminal 10 having transmitted the conference leaving instruction. In the necessary-media-data reception determining process of step S143, the CPU 61 executes the above described necessary-media-data reception determining program. The process contents of the necessary-media-data reception determining process have been already described, and thus will not be described in detail. When the necessary-media-data reception determining process of step S143 finishes, the process of the CPU 61 proceeds to step S144.

In step S144, based on the determination result of the necessary-media-data reception determining process of step S143 stored in the RAM 63, the CPU 61 determines whether necessary media data has been gathered with respect to the conference terminal 10 having transmitted the conference leaving instruction. In a case where necessary media data has been gathered ("YES" in step S144), the process of the CPU 61 proceeds to step S145. Meanwhile, in a case where necessary media data has not been gathered ("NO" in step S144), the CPU 61 finishes the missing-media-data receiving program.

In step S145, since all of necessary media data related to the conference terminal 10 having transmitted the conference leaving instruction has been gathered, the CPU 61 transmits a leaving completion notification to the conference terminal 10 having transmitted the conference leaving instruction. After the leaving completion notification is transmitted via the network N, the CPU 61 finishes the missing-media-data receiving program.

(Flow of Data Communication in Remote Conference Saving System)

Figure 12:
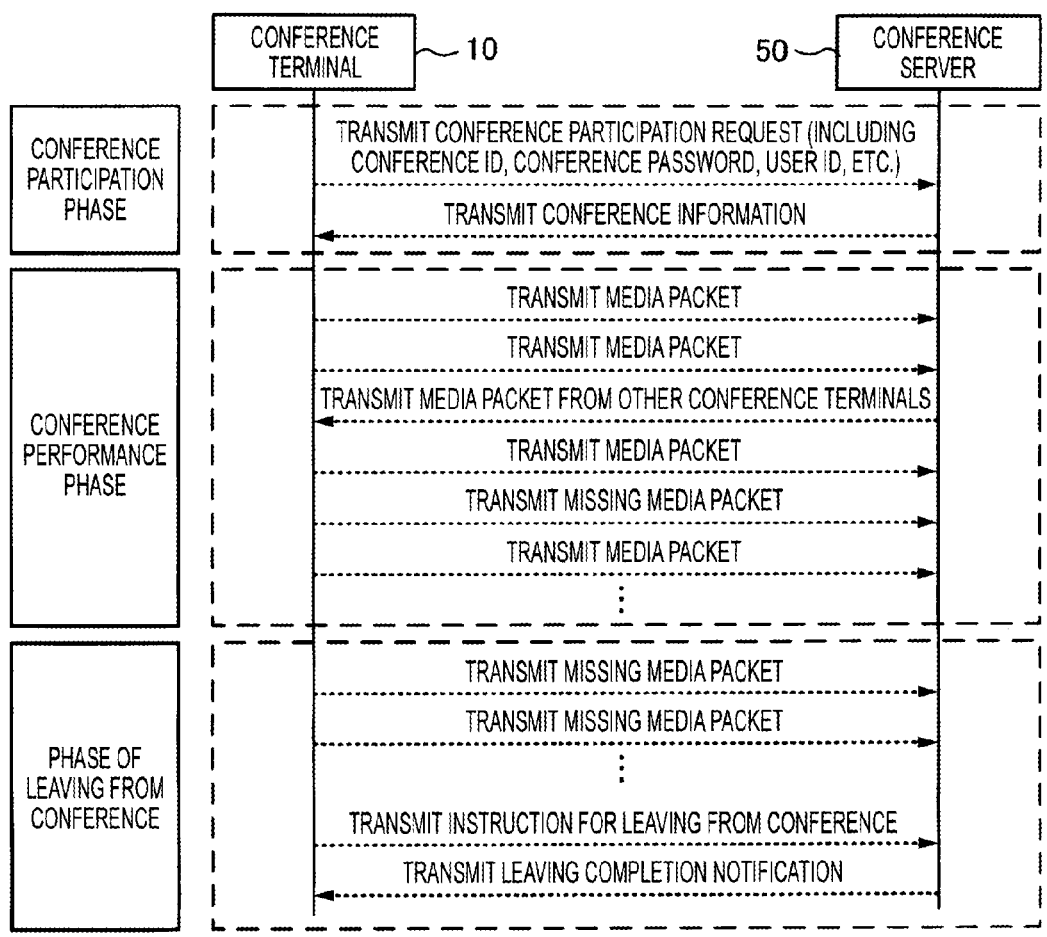
FIG. 12 is an explanatory view illustrating an example of data communication of the remote conference saving system.

Subsequently, the flow of data communication in the remote conference saving system 1 according to the present illustrative embodiment will be described with reference to FIG. 12. In the following description, a remote conference which is performed in the remote conference saving system 1 will be described in three phases of a conference participation phase, a conference performance phase, and a phase of leaving from a conference.

First, the flow of data in the conference participation phase will be described. The conference participation phase means a stage of receiving participation of conference participants in a remote conference at the time of hosting the remote conference, prior to performance of the remote conference. As described above, in the conference participation phase, as shown in FIG. 4, each conference terminal 10 to participate in the remote conference transmits a conference participation request to the conference server 50 via the network N based on an operation on the corresponding operation unit 31 in step S1. Meanwhile, as shown in FIG. 8, if the conference participation request is received from each conference terminal 10 ("YES" in step S101), the conference server 50 acquires conference information in step S102, and transmits the acquired conference information to each conference terminal 10 having transmitted the conference participation request, via the network N in step S103.

Subsequently, the flow of data in the conference performance phase will be described. The conference performance phase means a stage in which the conference terminals 10 participating in the remote conference perform communication of media data with one another, whereby the remote conference proceeds. In the conference performance phase, each conference terminal 10 participating in the remote conference executes the media data generating program (see FIG. 5), thereby generating media data of each frame, and stores the generated media data in the transmission buffer 23A at any time. Further, in a case where the degree of congestion in the network N is lower than the predetermined degree, each conference terminal 10 performs the media data transmitting process of step S12, thereby transmitting media data of one frame stored in the transmission buffer 23A, as a media packet in real time at any time.

Also, in a case where the predetermined degree or more of congestion has occurred in the network N, if necessary, each conference terminal 10 performs the missing-media-data storing process of step S11 and saves media data of one frame stored in the transmission buffer 23A, as missing media data in the missing-media-data holding area 23B.

Then, if the conference server 50 receives a media packet transmitted in real time from a conference terminal 10, the conference server 50 transmits the received media packet to the other conference terminals 10 participating in the same remote conference, via the network N in step S105. As described above, in the remote conference saving system 1, since communication of media data is performed in real time among the plurality of conference terminals 10 participating in the same remote conference, the remote conference proceeds in real time.

Also, if the conference server 50 receives a media packet transmitted in real time, in steps S106 to S109, the conference server 50 depacketizes the received media packet into media data and stores the media data in the media data storage area 66A, thereby generating conference record data.

In the conference performance phase, with the progress of the remote conference, communication of media data is performed in real time among the conference terminals 10. However, according to the data transmission states of the conference terminals 10, congestion may not occur in the network N. In a case where congestion has not occurred in the network N ("YES" in step S5, or "YES" in step S14), each conference terminal 10 of the remote conference saving system 1 transmits missing media data stored in the missing-media-data holding area 23B, as missing media packets to the conference server 50 in step S7 or S15). Communication of missing media packets is performed in a state where congestion has not occurred in the network N, and thus can be suppressed from influencing communication of media packets according to the media data transmitting process of step S12, and can contribute to smooth progress of the remote conference.

Subsequently, the flow of data in the phase of leaving from the conference will be described. The phase of leaving from the conference means a processing stage which is performed after a conference end instruction is issued by a conference terminal 10 until a leaving completion notification is performed. In a case where a conference end instruction is issued ("YES" in step S4), each conference terminal 10 stops execution of the media data generating program (see FIG. 5) in step S16, and then transmits all missing media data stored in the missing-media-data holding area 23B, to the conference server 50 in step S18. That is, in the phase of leaving from the conference, since real time generation and transmission of media data finish and then transmission of the missing media data is performed, the missing media data is transmitted surely in a state where there is no congestion in the network N. After transmission of all missing media data finishes, each conference terminal 10 performs the processes of steps S19 and S20 related to leaving from the remote conference. Therefore, according to the remote conference saving system 1, all missing media data stored in the missing-media-data holding area 23B of each conference terminal 10 is surely transmitted to the conference server 50.

Additionally, the conference server 50 uses the missing media data transmitted in that way to generate conference record data. As described above, media data is transmitted in real time from each conference terminal 10 and all missing media data is also transmitted. Therefore, the conference server 50 can surely generate conference record data indicating the contents of the remote conference from start to end of the remote conference.

(Conference Record Data Replay Program of Conference Terminal)

Figure 13:
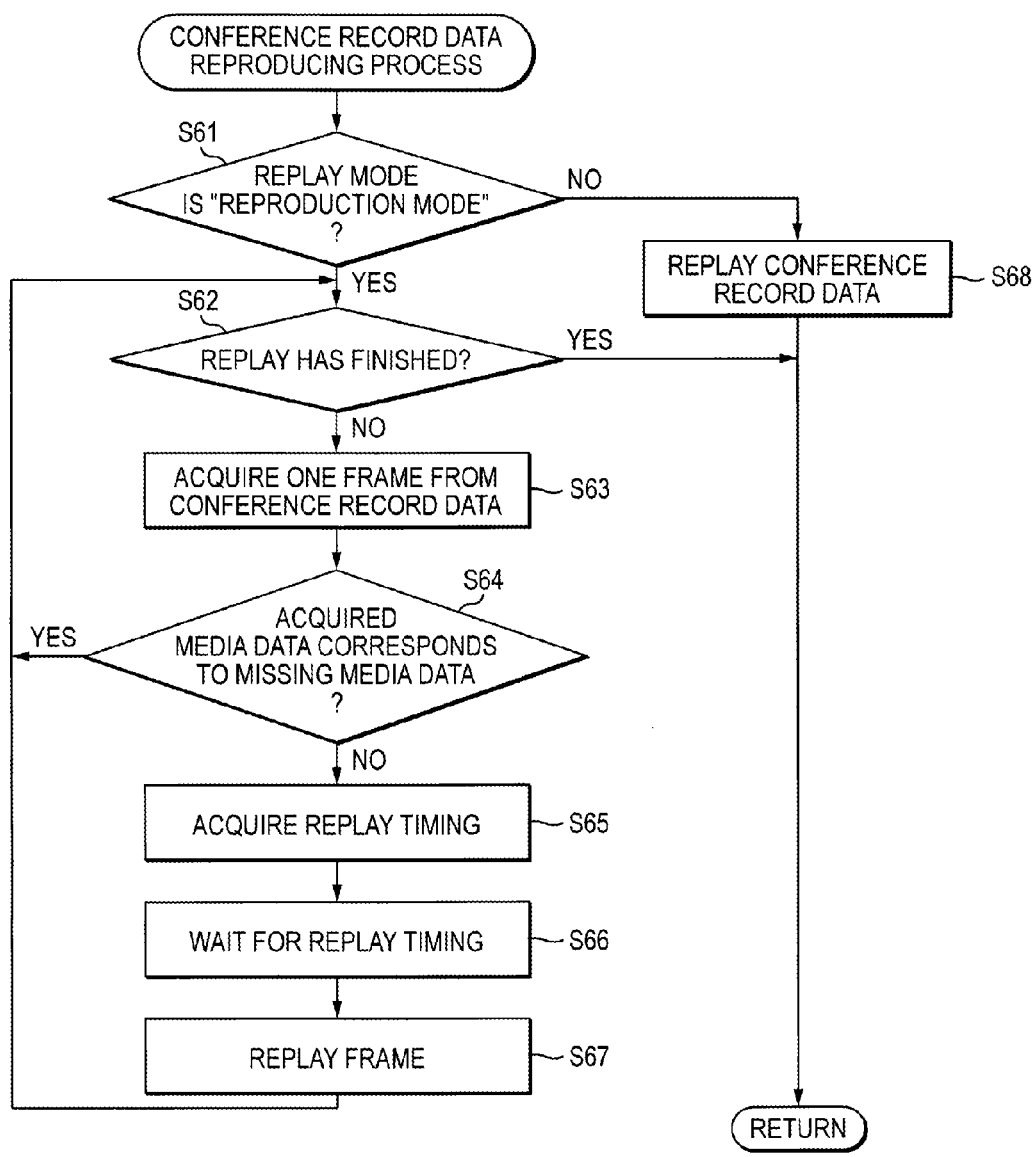
FIG. 13 is a flow chart illustrating a conference record data replay program of the conference terminal.

The conference record data replay program of a conference terminal 10 configuring the remote conference saving system 1 will be described in detail with reference to FIG. 13. The CPU 21 of the conference terminal 10 executes the conference record data replay program to replay conference record data stored in the conference record data storage area 66C of the conference server 50. In the present illustrative embodiment, replay of conference record data is performed in any one of replay modes "REPRODUCING MODE" and "HIGH IMAGE QUALITY MODE" according to arbitrary setting by a user. The replay mode "REPRODUCING MODE" is a mode of replaying conference record data, thereby reproducing the situation of a remote conference including failures (that is, occurrence of missing media data) caused in real time transmission and reception of media data by congestion in the network N, or the like at the time of performing the remote conference. Meanwhile, the replay mode "HIGH IMAGE QUALITY MODE" is a mode of replaying conference record data in a state where contents missed due to failures at the time of performing a remote conference has been complemented, thereby reproducing the situation of the remote conference.

Also, in the following description, it is assumed that each conference terminal 10 which is used by a user acquires conference record data indicating the situation of a remote conference desired by the user, and a timing table (see FIG. 14) generated according to generation of the conference record data, from the conference server 50, before starting execution of the conference record data replay program. The timing table is in association with the conference ID indicating the remote conference. Further, it is assumed that, for example, if the user operates the operation unit 31, the conference ID of the conference record data desired to be replayed is transmitted from the conference terminal 10 to the conference server 50, and the timing table associated with the corresponding conference ID is transmitted from the conference server 50 to the conference terminal 10. Furthermore, it is assumed that the user operates the operation unit 31 to set the replay mode of the conference record data to any one of the replay modes "REPRODUCING MODE" and "HIGH IMAGE QUALITY MODE", prior to start of execution of the conference record data replay program.

Here, the timing table will be described with reference to FIG. 14. As shown in FIG. 14, the timing table is a table indicating an item "TYPE OF MEDIA", an item "RECEPTION TIME", an item "EXISTENCE OF MISSING", and an item "FRAME NUMBER" for every media data of one frame configuring the conference record data.

As described above, media data of every frame transmitted in real time and media data of every frame transmitted as missing media data are coupled at any time by the data combining process of step S128, whereby the conference record data is generated.

The item "TYPE OF MEDIA" is specified with reference to header portions when the media data is transmitted as media packets or missing media packets. In the case shown in FIG. 14, two types, that is, a type "IMAGE" indicating that media data is based on image data acquired by the camera 33 of each conference terminal 10, and a type "SOUND" indicating that media data is based on sound data acquired by the microphone 34 of each conference terminal 10 correspond to the item "TYPE OF MEDIA".

The item "RECEPTION TIME" is information indicating the date and time of reception of media data by the conference server 50. Specifically, in a case where media data has been received as a media packet in real time ("YES" in step S104), the item "RECEPTION TIME" means a reception time acquired by performing the process of step S107. In this respect, in a case where media data has been received as a missing media packet, a process corresponding to step S107 is not performed. Therefore, as shown in FIG. 14, in the timing table, the reception time is in associated with media data of each frame received in real time, and any reception time is not in association with media data of each frame received as the missing media packet.

The item "EXISTENCE OF MISSING" is an example of missing information and indicates whether media data has been received in real time or has been received as missing media data. The item "EXISTENCE OF MISSING" is specified based on whether media data of each frame has been stored in the media data storage area 66A or in the missing-media-data storage area 66B. Also, as described above, the item "EXISTENCE OF MISSING" may be specified based on existence or non-existence of a reception time.

As described above, when media data of one frame is generated in real time according to the media data generating program (see FIG. 5), frame information which is added by performing the process of step S33 includes a frame number. A frame number is a number assigned in ascending order from the time of start of image acquisition and indicates the order of a generated frame. Therefore, not only with respect to media data of one frame received in real time but also with respect to media data of one frame received as a missing media packet, it is possible to specify the item "FRAME NUMBER" with reference to corresponding frame information.

Since each item of the timing table shown in FIG. 14 can be specified as described above, it is possible to generate a timing table corresponding to conference record data. Also, a timing table can be generated by performing updating whenever conference record data are coupled in the data combining process of step S128, or can also be generated when conference record data indicating a situation from start to end of a remote conference is generated.

Now, the conference record data replay program will be described in detail with reference to FIG. 13. As shown in FIG. 13, in step S61, the CPU 21 determines whether the replay mode set with respect to conference record data is "REPRODUCING MODE". In a case where the replay mode has been set to "REPRODUCING MODE" ("YES" in step S61), the process of the CPU 61 proceeds to step S62. Meanwhile, in a case where the replay mode has been set to "HIGH IMAGE QUALITY MODE" ("NO" in step S61), the process of the CPU 21 proceeds to step S68.

First, a process in a case of replaying the conference record data in "REPRODUCING MODE" will be described. When the CPU 21 proceeds to step S62, the CPU 21 determines whether the replay of the conference record data has finished. That is, the CPU 21 determines whether replay of media data of one frame related to the last frame number of the conference record data (that is, the largest frame number) has finished. In a case where the replay of the conference record data has finished ("YES" in step S62), the CPU 21 finishes the conference record data replay program. Meanwhile, in a case where the replay of the conference record data is in progress ("NO" in step S62), the process of the CPU 21 proceeds to step S63.

In step S63, the CPU 21 acquires media data of one frame from the conference record data, and sets the acquired media data as a replay object. At this time, the CPU 21 acquires media data of one frame having the smallest frame number, of media data not having been replayed yet, of the conference record data, as a replay object. Thereafter, the process of the CPU 21 proceeds to step S64.

In step S64, with reference to the timing table (see FIG. 14), the CPU 21 determines whether the media data of one frame set as a replay object in step S63 corresponds to missing media data. In a case where the media data set as a replay object corresponds to missing media data ("YES" in step S64), the CPU 21 returns to step S62 without replaying the media data set as a replay object. Meanwhile, in a case where the media data set as a replay object does not correspond to missing media data, that is, in a case where the media data set as a replay object is media data received in real time ("NO" in step S64), the process of the CPU 21 proceeds to step S65.

When the CPU 21 proceeds step S65, with reference to the timing table (see FIG. 14), the CPU 21 acquires the reception time of the media data of one frame set as a replay object, as a replay timing of the corresponding media data. After the replay timing is acquired, the process of the CPU 21 proceeds to step S66.

In step S66, the CPU 21 waits for the replay timing acquired in step S65 to come. When the replay timing comes, the process of the CPU 21 proceeds to step S67.

In step S67, based on the media data of one frame set as a replay object, the CPU 21 uses the display 32 and the speaker 35 to perform image output and sound output, thereby replaying the media data related to the replay object. Thereafter, the process of the CPU 21 returns to step S62 to reproduce new media data of one frame.

Therefore, the CPU 21 performs the processes of steps S62 to S67 to replay the conference record data in "REPRODUCING MODE", thereby replaying the conference record data except for portions transmitted as missing media data ("YES" in step S64). As described above, missing media data is portions which couldn't be transmitted to other conference terminals 10 participating in the remote conference due to congestion in the network N, or any other cause at the time of performing the remote conference. That is, according to the remote conference saving system 1, the conference record data can be replay in "REPRODUCING MODE", whereby it is possible to reproduce the situation of the remote conference including failures (that is, occurrence of missing media data) caused in transmission and reception of the media data at the time of performing a remote conference.

Subsequently, a process in a case of replay the conference record data in "HIGH IMAGE QUALITY MODE" will be described. In step S68, the CPU 21 sequentially replays all media data composing the conference record data, regardless of whether the media data has been received in real time or has been received as missing media data. At the time of a remote conference, the conference server 50 generates the conference record data in a state where contents missed due to failures caused during performing of the remote conference such that the conference record data indicates the situation from start to end of the remote conference. Therefore, according to the remote conference saving system 1, the conference record data can be replayed in "HIGH IMAGE QUALITY MODE", whereby it is possible to reproduce the situation from start to end of the remote conference without missing the contents of the remote conference.

As described above, the remote conference saving system 1 according to the present illustrative embodiment is configured by connecting the conference terminals 10 and the conference server 50 via the network N such that communication is possible and is used for a remote conference via the network N and is configured to be able to control the saving service unit 65 of the conference server 50, thereby saving media data transmitted and received on a remote conference.

In the remote conference saving system 1, each conference terminal 10 executes a media data generating program (see FIG. 5) at the time of performing a remote conference, thereby generating media data of one frame in real time, and saving the generated media data in the transmission buffer 23A at any time. Further, in a case where the degree of congestion in the network N between the conference terminals 10 and the conference server 50 is lower than the predetermined degree (step S8, and "YES" in step S9), each conference terminal 10 transmits the media data in the transmission buffer 23A in real time in step S12. Therefore, according to the remote conference saving system 1, it is possible to transmit media data in real time at any time.

Also, in a case where the degree of congestion in the network N between the conference terminals 10 and the conference server 50 is equal to or higher than the predetermined degree (step S8, and "NO" in step S9), each conference terminal 10 temporarily saves media data of one frame in the transmission buffer 23A, as the missing media data in the missing-media-data holding area 23B. Thereafter, if the congestion in the network N is naturally resolved in a process of performing transmission and reception of media data in real time ("NO" in step S5, or "YES" in step S14), or if the congestion in the network N is resolved according to end of the remote conference of step S16, each conference terminal 10 transmits missing media data stored in the missing-media-data holding area 23B, to the conference server 50 in step S7, S15, or S18.

Therefore, according to the remote conference saving system 1, it is possible to transmit missing media data necessary for the conference server 50 to generate conference record data, to the conference server 50, without increasing load on the network. Next, the conference server 50 executes the conference record data generating program, thereby generating conference record data based on media data stored in the media data storage area 66A and the missing-media-data storage area 66B. Therefore, according to the remote conference saving system 1, it is possible to generate conference record data without missing in the contents from start to end of a remote conference, and thus it is possible to replay the contents of the remote conference at high degree of accuracy.

Also, according to the remote conference saving system 1, in the necessary-media-data reception determining process, the conference server 50 computes the degree of similarity between a plurality of media data items existing in the temporal vicinity of unreceived media data of one frame in step S133, and determines whether the unreceived media data of one frame is necessary to generate conference record data and thus needs to be received from a corresponding conference terminal 10 in steps S134 and S135. Therefore, according to the remote conference saving system 1, since media data really necessary with respect to generation of conference record data is transmitted and received, it is possible to minimize load on the network, and it is possible to generate conference record data capable of reproducing the contents of a remote conference at high degree of accuracy.

Further, in the remote conference saving system 1, each conference terminal 10 determines existence or non-existence of host authority included in the conference information in step S10. In a case where the conference terminal 10 has the host authority ("YES" in step S10), in step S11, the conference terminal 10 saves media data of one frame which has not been transmitted in real time, as missing media data in the missing-media-data holding area 23B. Here, the importance of media data which is transmitted from the conference terminals 10 in a remote conference is different depending on roles in the remote conference. Therefore, according to the remote conference saving system 1, it is possible to temporarily save media data including important contents, as missing media data, and use the saved media data to generate conference record data later. Therefore, the remote conference saving system 1 can provide conference record data including important contents and capable of reproducing the contents of a remote conference at high degree of accuracy.

Also, in the remote conference saving system 1, if the conference server 50 receives the media packet from the conference terminal 10 in real time, the conference server 50 acquires the reception time in step S107, and saves the reception time in association with the received media data in step 108. Further, when the conference terminal 10 replays conference record data according to the conference record data replay program, the conference terminal 10 receives selection of "REPRODUCING MODE" or "HIGH IMAGE QUALITY MODE" by the user. In a case of replaying the conference record data in "REPRODUCING MODE", the conference terminal 10 excludes media data received as missing media data ("YES" in step S64), and sequentially replays media data of each of frames configuring the conference record data in step S67. That is, according to the remote conference saving system 1, the conference record data can be replayed in "REPRODUCING MODE", whereby it is possible to reproduce the situation of the remote conference including failures (that is, occurrence of missing media data) caused in transmission and reception of media data at the time of performing the remote conference. Especially, since the conference record data is replayed except for portions missed due to the communication state of the network N in the middle of performance of the remote conference, it is possible to specify contents which couldn't be transmitted to the participants of the remote conference. Therefore, according to the remote conference saving system 1, it is also possible to take appropriate measures for complementing the missed portions.

Further, in the remote conference saving system 1, the plurality of conference terminals 10 is connected to the conference server 50 via the network N. When the conference server 50 receives a media packet transmitted in real time from a conference terminal 10 ("YES" in step S104), in step S105, the conference server 50 transmits the received media packet to the other conference terminals 10 participating in the same remote conference. Therefore, in the remote conference saving system 1, at the time of performing the remote conference, the media data are transmitted and received in real time among the plurality of conference terminals 10 participating in the remote conference, so as to be used for progress of the remote conference.

Meanwhile, if the conference server 50 receives the missing media packet which a conference terminal 10 has transmitted by performing the process of step S7, S15, or S18 ("YES" in step S114), in step S141, the conference server 50 saves the received missing media packet in the missing-media-data storage area 66B without transmitting the received missing media packet to the other conference terminals 10 participating in the remote conference. Therefore, according to the remote conference saving system 1, since a missing media packet transmitted from a conference terminal 10 is not transmitted to the other conference terminals 10, it is possible to suppress load on the network from increasing.

Although this disclosure has been described based on the illustrative embodiments this disclosure is not limited to the above-mentioned illustrative embodiment, but may be variously modified for improvement without departing from the scope of this disclosure. For example, in the above described illustrative embodiment, each conference terminal 10 is configured to determine whether the state of configuration in the network N is equal to or lower than the predetermined degree, or not, and perform transmission of missing media packets in step S7, S15, or S18. However, this disclosure is not limited to this configuration. For example, the conference server 50 may be configured to determine whether the state of configuration in the network N is equal to or lower than the predetermined degree, or not, and request each conference terminal 10 to transmit missing media packets. In this case, if a conference terminal 10 receives the request from the conference server 50, the conference terminal 10 performs transmission of missing media packets. Also, in order to detect the state of congestion, in the above described illustrative embodiment, the amount of media data stored in the transmission buffer 23A is monitored. However, the state of congestion may be detected by any other method. For example, each conference terminal 10 may determine the state of congestion based on a re-transmission request of TCP received from the conference server 50. For example, if a re-transmission request of TCP is received from the conference server 50, it is possible to determine that congestion has occurred and the state of the congestion is higher than the predetermined degree.

In the above described illustrative embodiment, determination on whether the network N is in a predetermined state is performed according to the state of congestion, specifically, by monitoring the amount of media data saved in the transmission buffer 23A in step S5 or S51. However, determination on whether the network N is in the predetermined state may be performed using any other parameter. For example, instead of the process of at least one of step S5 of FIG. 4 and step S51 of FIG. 7, a process of determining whether the capacity of a transmission channel, a packet loss rate, a delay time, or the like satisfies a predetermined reference may be performed. For example, in a case where the capacity of a transmission channel is equal to or smaller than a predetermined value, in a case where a packet loss rate is equal to or larger than a predetermined value, or in a case where a delay time is equal to or larger than a predetermined value, since it can be considered that it is difficult to transmit and receive media data in real time, it is possible to determine that the network N is not in the predetermined state. Also, in the above described steps S41 and S42, the state of the network N is detected with reference to the generation time of media data related to a transmission candidate. However, the state of the network N may be detected with reference to any other parameter such as the capacity of a transmission channel, a packet loss rate, or a delay time. Also, any other parameter such as the capacity of a transmission channel, a packet loss rate, or a delay time may be appropriately determined based on a packet generated, for example, according to a PING command transmitted and received between the conference terminals 10 and the conference server 50.

Also, in a case where the conference server 50 requests a conference terminal 10 to transmit missing media packets, the conference server 50 may specify missing media data corresponding to media data necessary to generate conference record data, and request the conference terminal 10 to transmit only the specified missing media data. In this case, the remote conference saving system 1 can minimize load on the network with respect to transmission and reception of missing media data.

Further, in the above described illustrative embodiment, each conference terminal 10 is configured to acquire conference record data desired by a user, and a timing table (see FIG. 14) corresponding to the conference record data, and replay the conference record data. However, this disclosure is not limited to this aspect. For example, the conference server 50 may actively control the process of replaying the conference record data.

Specifically, in a case of replaying conference record data desired by a user, in "REPRODUCING MODE", the conference server 50 reads media data of each frame from the conference record data, and transmits the read media data to the conference terminal 10. When receiving the media data of each frame from the conference server 50, the conference terminal 10 replays the media data in frame units. In this case, the conference server 50 determines whether the media data of each frame set as a transmission object for the conference terminal 10 is missing media data. When the media data set as a transmission object corresponds to missing media data, the conference server 50 performs a process related to the next media data without transmitting the media data set as a transmission object to the conference terminal 10. According to this configuration, each conference terminal 10 can perform replaying of conference record data in the same way as in "REPRODUCING MODE" of the above described illustrative embodiment.

What is claimed is:

1. A remote conference system comprising:
   a communication terminal; and
   a conference server connected to the communication terminal via an IP network, wherein the communication terminal comprises:
   a first processor; and
   first memory storing computer-readable instructions that, when executed by the first processor, instruct the first processor to perform processes comprising:
   generating partial media data composing a portion of media data at predetermined intervals, wherein the media data includes at least one of image data and sound data and the media data is to be transmitted to the conference server via the IP network in a remote conference;
   adding identification information indicating an order of a temporal position of the partial media data in the media data, to the partial media data;
   detecting a state of the IP network between the conference server and the communication terminal;
   performing first determination on whether to transmit the partial media data to the conference server, based on the detected state of the IP network;
   performing first transmission of transmitting the partial media data to the conference server when it is determined to transmit the partial media data to the conference server by the first determination;
   performing first saving of saving the partial media data in a storage device of the communication terminal when it is determined to not transmit the partial media data to the conference server by the first determination; and
   performing second transmission of transmitting partial media data saved in the storage device, as missing partial media data, to the conference server at a predetermined timing, and
   wherein the conference server comprises:
   a second processor; and
   second memory storing computer-readable instructions that, when executed by the second processor, instruct the second processor to perform processes comprising:
   performing first reception of receiving the partial media data from the communication terminal;

performing second saving of saving the partial media data received in the first reception, in a storage device of the conference server;

performing second reception of receiving the missing partial media data from the communication terminal;

performing third saving of saving the missing partial media data received in the second reception, in association with missing information indicating that the partial media data received in the second reception is the missing partial media data, in the storage device of the conference server; and generating the media data based on the partial media data and the missing partial media data stored in the storage device of the conference server.

2. A non-transitory computer-readable medium storing computer-readable instructions that, when executed by a processor of a communication terminal, instruct the processor to perform processes comprising:

generating partial media data composing a portion of media data at predetermined intervals, wherein the media data includes at least one of image data and sound data and the media data is to be transmitted to the conference server, connected to the communication terminal via a network in a remote conference;

adding identification information indicating an order of a temporal position of the partial media data in the media data, to the partial media data;

detecting a state of the network between the conference server and the communication terminal;

performing first determination on whether to transmit the partial media data to the conference server, based on the detected state of the network;

performing first transmission of transmitting the partial media data to the conference server when it is determined to transmit the partial media data to the conference server by the first determination;

performing first saving of saving the partial media data in a storage device of the communication terminal when it is determined to not transmit the partial media data to the conference server by the first determination; and performing second transmission of transmitting partial media data saved in the storage device, as missing partial media data, to the conference server at a predetermined timing.

3. The non-transitory computer-readable medium according to claim 2, wherein the processor further performs processes comprising:

performing second determination on whether a termination operation indicating end of the remote conference has been performed, based on operation information received from an operation unit, and wherein performing the second transmission comprises transmitting the partial media data saved in the storage device to the conference server as the missing partial media data, when it is determined in the second determination that the termination operation has been performed.

4. The non-transitory computer-readable medium according to claim 2, wherein the processor further performs processes comprising:

performing third determination on whether the degree of congestion in the network between the conference server and the communication terminal satisfies a predetermined condition, and wherein performing the second transmission comprises transmitting the partial media data saved in the storage device to the conference server as the missing partial media data, when it is determined by the third determination that the degree of congestion in the network between the conference server and the communication terminal satisfies the predetermined condition.

5. The non-transitory computer-readable medium according to claim 4, wherein the processor further performs processes comprising:

performing second saving of saving the partial media data in a transmission buffer, prior to the first transmission, and wherein performing the first transmission comprises transmitting the partial media data stored in the transmission buffer to the conference server, and wherein performing the third determination comprises determining whether the degree of congestion in the network between the conference server and the communication terminal satisfies the predetermined condition based on the amount of the partial media data stored in the transmission buffer.

6. The non-transitory computer-readable medium according to claim 5, wherein performing the adding of the identification information comprises further adding first time information indicating a generation time of the media data to the partial media data, and wherein the detecting of the state of the network is performed based on comparison between the time indicated by the first time information of the partial media data stored in the transmission buffer and the detection time of the state of the network.

7. The non-transitory computer-readable medium according to claim 6, wherein the detecting of the state of the network is performed based on comparison between a time indicated by the first time information of the oldest partial media data of the partial media data stored in the transmission buffer and the detection time of the state of the network.

8. The non-transitory computer-readable medium according to claim 2, wherein the processor further performs processes comprising:

performing fourth determination on whether an attribute of a user in the remote conference corresponds to a predetermined attribute, wherein performing the first saving comprises saving the partial media data in the storage device when it is determined by the first determination to not transmit the partial media data to the conference server and it is determined by the fourth determination that the attribute corresponds to the predetermined attribute, and wherein performing the first saving comprises not saving the partial media data in the storage device when it is determined by the first determination to not transmit the partial media data to the conference server and it is determined by the fourth determination that the attribute does not correspond to the predetermined attribute.

9. The non-transitory computer-readable medium according to claim 2, wherein the processor further performs processes comprising:

acquiring frame data from the media data according to the identification information, wherein the frame data is one of the partial media data and the missing partial media data;

performing fifth determination on whether the acquired frame data is in association with missing information indicating that the acquired frame data is the missing partial media data; and replaying the frame data when it is determined by the fifth determination that the acquired frame data is not in association with the missing information, wherein the replaying does not replay the frame data when it is determined by the fifth determination that the acquired frame data is in association with the missing information.

10. The non-transitory computer-readable medium according to claim 9, wherein the replaying the frame data comprises replaying according to second time information indicating the reception time of the frame data by the conference server.

11. A non-transitory computer-readable medium storing computer-readable instructions that, when executed by a processor of a conference server, instruct the conference server to perform processes comprising:

performing first reception of receiving partial media data including image data and sound data from a communication terminal, the partial media data composing a portion of media data which is received from the communication terminal in a remote conference, the remote conference comprising a plurality of media data designated by the communication terminal to be provided to participants of the remote conference in a specified order, wherein the partial media data includes indentification information indicating an order of a temporal position of the partial media data in the media data and is data that has transmitted in real-time and in the specified order during the remote conference;

performing first saving of saving the partial media data received in the first reception, in a first storage area of a storage device of the conference server;

performing second reception of receiving missing partial media data including image data and sound data from the communication terminal, the missing partial media data composing another portion of the media data, which is received from the communication terminal in the remote conference and is different from the portion of the media data which the partial media data configures, wherein the missing partial media data includes the identification information and is data that has not transmitted in real-time and not in the specified order during the remote conference;

performing second saving of saving the missing partial media data received in the second reception, in association with missing information indicating that the partial media data received in the second reception is the missing partial media data, in the storage device;

generating the media data based on the partial media data and the missing partial media data stored in a second storage area that is different from the first storage area of the storage device; and transmitting the partial media data received in the first reception to a communication terminal participating in the remote conference, wherein the transmitting does not transmit the missing partial media data received in the second reception to the communication terminal participating in the remote conference.

12. The non-transitory computer-readable medium according to claim 11, wherein the processor further performs processes comprising:

specifying unreceived partial media data, which is not received from the communication terminal, based on the identification information of the partial media data; and determining whether the unreceived partial media data is necessary to generate the media data, by comparing the contents of a plurality of partial media data items existing in the temporal vicinity of the specified unreceived partial media data, based on the identification information.

13. The non-transitory computer-readable medium according to claim 11, wherein, performing the first saving comprises saving second time information indicating a reception time of the partial media data in the first reception in association with the partial media data in the storage device.

14. The non-transitory computer-readable medium according to claim 11, wherein the processor further performs process comprising:

performing, in a case where a conference leaving instructions has been received, a necessary-media-data reception determining process of determining whether necessary media data has been received, and transmitting, in a case where it is determined that the necessary media data has been received, completion notification to the communication terminal.

15. The non-transitory computer-readable medium according to claim 11, wherein the first storage area is a real-time transmission storage area and the second storage area is a missing media data storage area storing a plurality of missing media data, each of the plurality of missing media data not being received in the specified order during the remote conference and each corresponding to a different position within the specified order.

* * * * *

UNITED STATES PATENT AND TRADEMARK OFFICE
CERTIFICATE OF CORRECTION

| | | |
|---|---|---|
| PATENT NO. | : 9,490,992 B2 | |
| APPLICATION NO. | : 14/068668 | |
| DATED | : November 8, 2016 | |
| INVENTOR(S) | : Oike | |

It is certified that error appears in the above-identified patent and that said Letters Patent is hereby corrected as shown below:

In the Claims

Column 33, Claim 2, Line 22:
Delete "to the" and insert --to a--

Column 33, Claim 3, Line 49:
Insert --an-- after "indicating"

Column 33, Claim 4, Line 61:
Delete "the" and insert --a--

Column 34, Claim 5, Lines 9-10:
Delete "and" after "transmission,"

Column 34, Claim 6, Line 26:
Insert --generation-- after "the"

Column 34, Claim 6, Line 28:
Delete "and the" and insert --and a--

Column 35, Claim 10, Line 11:
Delete "indicating the" and insert --indicating a--

Column 35, Claim 11, Line 26:
Delete "indentification" and insert --identification--

Column 36, Claim 14, Line 32:
Delete "process" and insert --processes--

Signed and Sealed this
Ninth Day of May, 2017

Michelle K. Lee
*Director of the United States Patent and Trademark Office*